US012560833B2

(12) United States Patent
Hsieh et al.

(10) Patent No.: US 12,560,833 B2
(45) Date of Patent: Feb. 24, 2026

(54) DISPLAY DEVICE

(71) Applicants:InnoLux Corporation, Miao-Li County (TW); CARUX TECHNOLOGY PTE. LTD., Singapore (SG)

(72) Inventors: Hong-Sheng Hsieh, Miao-Li County (TW); Chia-Hsien Hsieh, Miao-Li County (TW); Chih-Yung Hsieh, Miao-Li County (TW); Tien-Jen Lin, Tainan (TW); Tsan-Po Weng, Tainan (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 2 days.

(21) Appl. No.: 18/663,374

(22) Filed: May 14, 2024

(65) Prior Publication Data

US 2024/0411161 A1 Dec. 12, 2024

(30) Foreign Application Priority Data

Jun. 9, 2023 (CN) ......................... 202310682958.2

(51) Int. Cl.
| | |
|---|---|
| *G02F 1/13* | (2006.01) |
| *G02F 1/13357* | (2006.01) |
| *G06F 3/01* | (2006.01) |
| *G06F 3/041* | (2006.01) |
| *G06F 21/84* | (2013.01) |

(52) U.S. Cl.
CPC ...... G02F 1/1323 (2013.01); G02F 1/133603 (2013.01); G06F 3/013 (2013.01); G06F 3/0416 (2013.01); G06F 21/84 (2013.01)

(58) Field of Classification Search
CPC .. G02F 1/1323; G02F 1/133603; G06F 3/013; G06F 3/0416; G06F 21/84
See application file for complete search history.

(56) References Cited

U.S. PATENT DOCUMENTS

| | | | |
|---|---|---|---|
| 1,002,593 A | 9/1911 | Macbeth | |
| 2017/0255041 A1* | 9/2017 | Chang ............... | G02F 1/134336 |
| 2017/0255786 A1* | 9/2017 | Krishnamurthi ........ | G06F 21/32 |
| 2018/0239214 A1* | 8/2018 | Ji ........................... | G02F 1/1323 |
| 2019/0325154 A1* | 10/2019 | Divakaran .......... | G06F 21/6245 |
| 2020/0124834 A1* | 4/2020 | Woodgate ........... | H01L 25/0753 |
| 2021/0294133 A1* | 9/2021 | Yuan .................... | G02F 1/13439 |
| 2023/0095576 A1* | 3/2023 | Ureche .................... | H04L 63/10 |
| | | | 726/26 |

(Continued)

FOREIGN PATENT DOCUMENTS

| | | |
|---|---|---|
| CN | 106773156 A | 5/2017 |
| CN | 108701196 B | 3/2022 |

OTHER PUBLICATIONS

Chinese language office action dated Aug. 15, 2024, issued in application No. TW 112135441.

*Primary Examiner* — Ryan A Lubit

(74) *Attorney, Agent, or Firm* — JCIPRNET

(57) ABSTRACT

A display device for controlling a privacy region is provided. The display device includes a display unit configured to display images; a touch unit electrically connected to the display unit, wherein the privacy region is determined by the touch unit; and a light control unit electrically connected to the touch unit and configured to control an emitting light angle of the privacy region.

13 Claims, 21 Drawing Sheets

(56)  References Cited

U.S. PATENT DOCUMENTS

| | | | |
|---|---|---|---|
| 2023/0099000 A1* | 3/2023 | Harrold | G02F 1/134309 |
| | | | 345/697 |
| 2023/0147590 A1* | 5/2023 | Cheng | G02F 1/133512 |
| | | | 349/12 |
| 2023/0205923 A1* | 6/2023 | Ibtehaz | G06N 3/02 |
| | | | 726/26 |

* cited by examiner

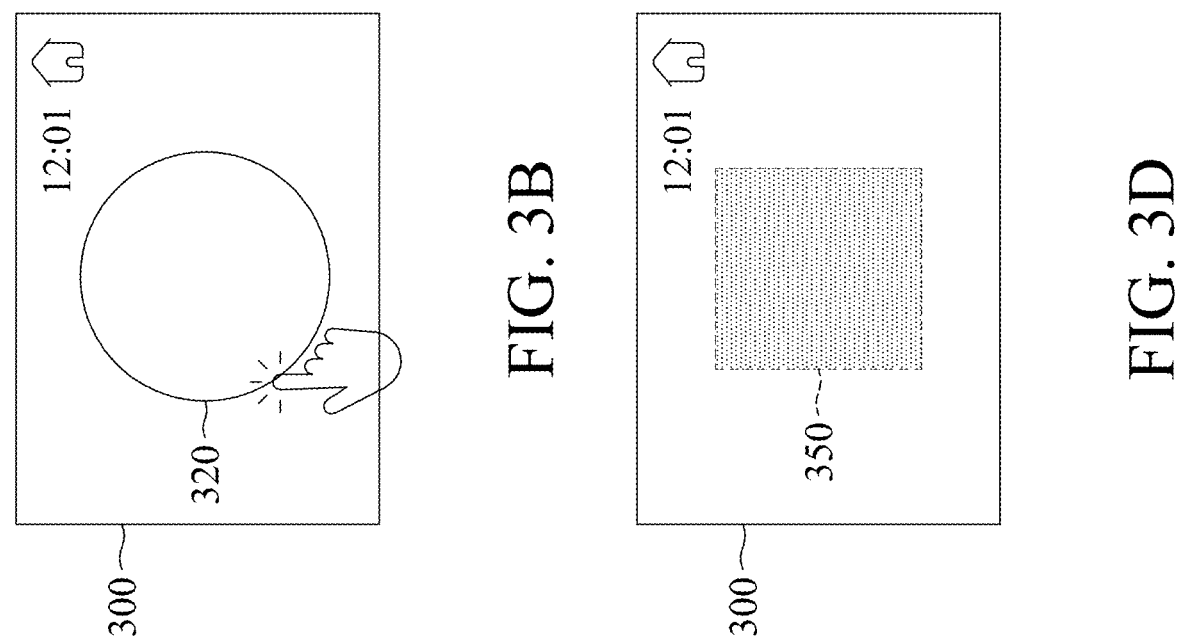
FIG. 3A
FIG. 3B
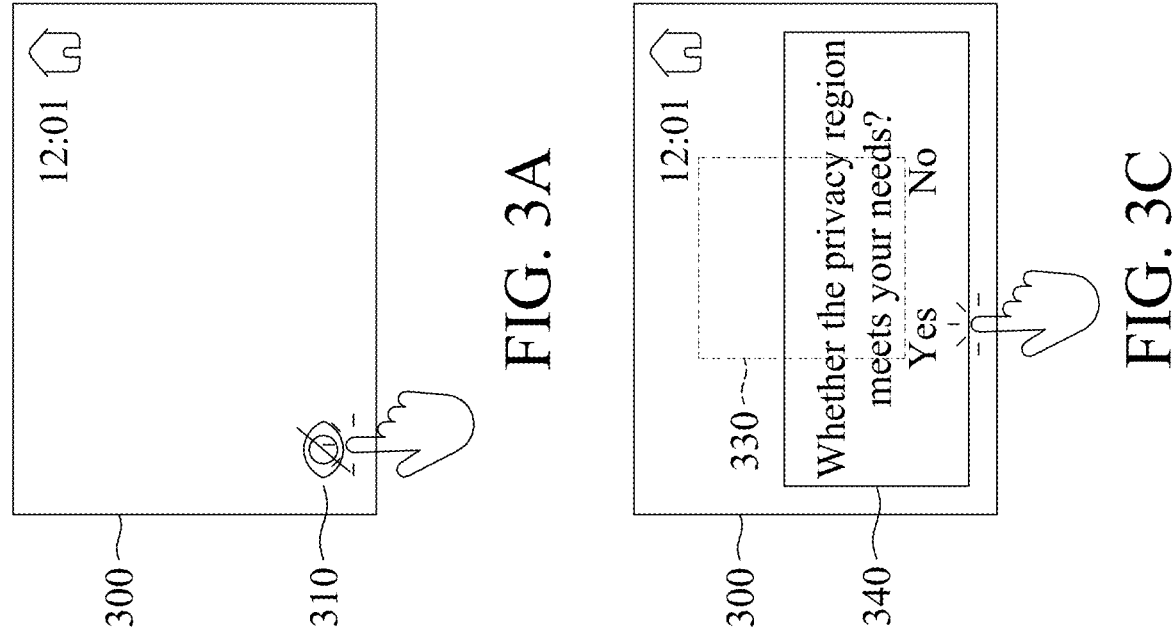
FIG. 3C
FIG. 3D

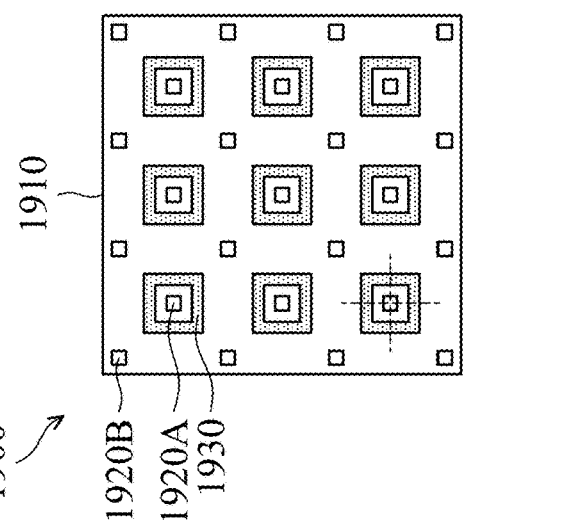
FIG. 19C
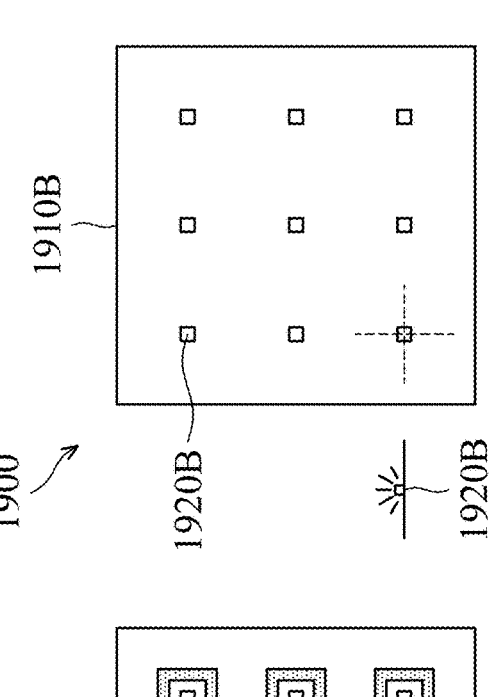
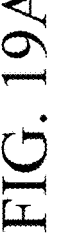
FIG. 19B
FIG. 19A

DISPLAY DEVICE

CROSS REFERENCE TO RELATED APPLICATIONS

This Application claims priority of China Patent Application No. 2023106829582, filed on Jun. 9, 2023, the entirety of which is incorporated by reference herein.

BACKGROUND OF THE INVENTION

Field of the Invention

The present disclosure relates to an electronic device, and, in particular, to an electronic device that can control a privacy region.

Description of the Related Art

Electronic devices equipped with displays have been widely used in daily life. They include automotive displays, laptop and desktop computer displays, interactive kiosks (kiosks), and automated teller machines (ATMs). Currently, on some electronic devices, the user can adjust the visible angle of the display or a part thereof, so as to reduce the angle at which the display is legible to people other than the user, thereby achieving an anti-peep function and protecting the user's privacy.

However, different users have different needs regarding the locations and sizes of the privacy region on the display for which the privacy function is required. Moreover, for the same user, when the display is used to display different information, the required privacy region will also be different.

Therefore, solving the problems described above has become an important issue.

BRIEF SUMMARY OF THE INVENTION

An embodiment of the present disclosure provides a display device for controlling a privacy region. The display device includes a display unit, a processing unit, and a light control unit. The display unit is configured to display images. The processing unit is electrically connected to the display unit. The processing unit is configured to define the privacy region according to the predefined privacy requirement. The light control unit is electrically connected to the processing unit and configured to control the emitting light angle of the privacy region.

An embodiment of the present disclosure provides a display device for controlling a privacy region. The display device includes a display unit, a touch unit, and a light control unit. The display unit is configured to display images. The touch unit is electrically connected to the display unit. The privacy region is determined by the touch unit. The light control unit is electrically connected to the touch unit. The light control unit is configured to control the emitting light angle of the privacy region.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 3A to 3D illustrate simplified diagrams of an embodiment of the display method shown in FIG. 2, in accordance with some embodiments of the present disclosure.

FIGS. 19A to 19C illustrate schematic diagrams of a privacy emitting light module of a privacy display, in accordance with some embodiments of the present disclosure.

DETAILED DESCRIPTION OF THE INVENTION

Figure 1:
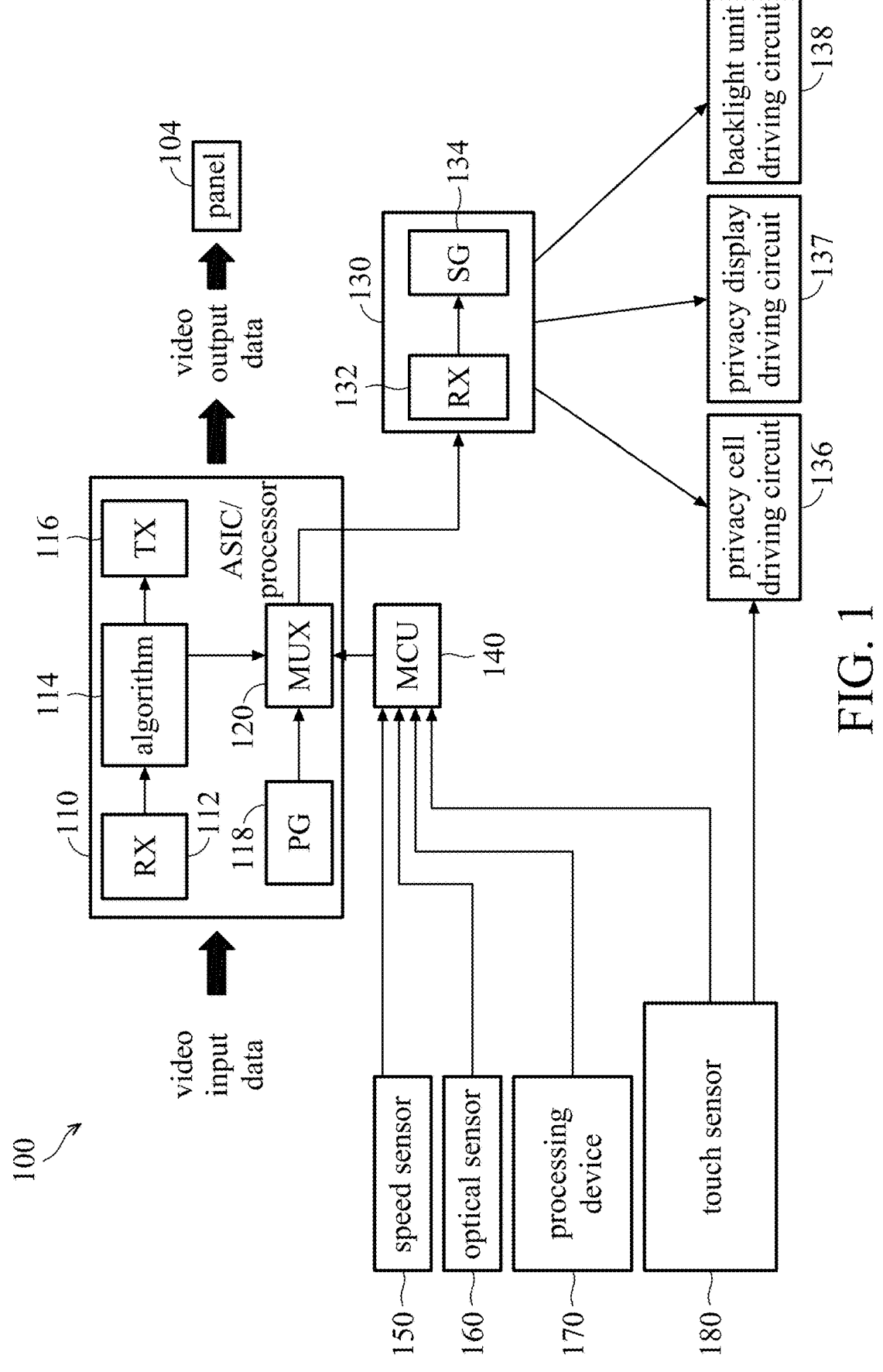
FIG. 1 illustrates a schematic diagram of an electronic device including a display unit, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When a number or a range of numbers is described with "about," "approximate," and the like, the term is intended to encompass numbers that are within a reasonable range including the number described, such as within +/−10% of the number described or other values as understood by person skilled in the art.

In the present disclosure, the length, and width may be measured by using an optical microscope (OM), and the thickness may be measured from a section image in a scanning electron microscope (SEM), but the present disclosure is not limited thereto. In addition, there may be a certain error in any two values or directions used for comparison. In the present disclosure, the features between various embodiments can be mixed and matched arbitrarily as long as they do not violate the spirit of the disclosure or conflict between each other.

In the present disclosure, the electronic device may include a display device, a backlight device, an antenna device, a sensing device, a splicing device or a therapeutic and diagnostic device, but is not limited thereto. The electronic device may be a bendable or flexible electronic device. The display device may be a non-self-luminous display device or a self-luminous display device. The antenna device may be a liquid-crystal antenna device or a non-liquid-crystal antenna device, and the sensing device may be a sensing device that senses capacitance, light, heat energy, or ultrasonic waves, but are not limited thereto. Electronic components may include passive elements and active elements, such as capacitors, resistors, inductors, diodes, transistors, and the like. The diodes may include light-emitting diodes or photodiodes. The light-emitting diode may include, for example, an organic light-emitting diode (OLED), a sub-millimeter light-emitting diode (mini LED), a micro light-emitting diode (micro LED), or a quantum dot light-emitting diode (QDLED), but is not limited thereto. The splicing device may be, for example, a display splicing device or an antenna splicing device, but is not limited thereto. It should be noted that, the electronic device may be any arrangement and combination of the above devices, but is not limited thereto. Hereinafter, the display device will be used as an electronic device to illustrate the content of the present disclosure, but the present disclosure is not limited thereto.

As described above, when using a display, the privacy regions required by the different users are different. Therefore, the present disclosure provides various embodiments for users to define desired privacy regions according to their requirements.

FIG. 1 illustrates a schematic diagram of an electronic device 100 including a display unit, in accordance with some embodiments of the present disclosure. In some embodiments, the electronic device 100 may be a smartphone, a tablet computer, an automotive computer, a laptop computer, a desktop computer, a kiosk, or an ATM, but the resent disclosure is not limited thereto. In some embodiments, the display unit of the electronic device 100 may be a monitor, a touch display, a curved display, a free shape display, and the like, but the present disclosure is not limited thereto.

Referring to FIG. 1, the electronic device 100 may include at least a panel 104, a first control circuit 110, and a second control circuit 130. In some embodiments, the panel 104 may be a part of the display unit of the electronic device 100. In some embodiments, the first control circuit 110 may be a display integrated circuit (IC) of the display unit of the electronic device 100, but the present disclosure is not limited thereto. In some embodiments, the first control circuit 110 may include or be a processing device or an application specific IC (ASIC), but the present disclosure is not limited thereto.

In some embodiments, the first control circuit 110 may at least include a receive video data module 112, an algorithm 114, a transceiver video data module 116, a pattern generator 118, and a multiplexer (MUX) 120. In some embodiments, the algorithm 114 may be implemented as an application program, stored in a storage device (not shown), and loaded and performed by the first control circuit 110 or the processing device in the first control circuit 110; alternatively, the algorithm 114 may be implemented as a circuit and be a part of the first control circuit 110, but the present disclosure is not limited thereto. In some embodiments, the first control circuit 110 can receive the video input data through the receive video data module 112 and decode it, and then operates the decoded data by the algorithm 114. Afterward, the operated data is transferred to the transceiver video data module 116 to encode it and output the video output data, and the video output data is finally displayed on the panel 104. In some embodiments, the multiplexer 120 may output data to the second control circuit 130.

In some embodiments, the second control circuit 130 may be a driver IC of a privacy cell (p-cell), a privacy display, or a backlight unit (BLU) of the electronic device 100, but the present disclosure is not limited thereto. In some embodiments, the second control circuit 130 may at least include a receive video data module 132 and a signal output (SG) 134. In some embodiments, the second control circuit 130 may receive data related to the privacy function from the multiplexer 120 through the receive video data module 132. Then, the second control circuit 130 may output timing and data through the signal output 134 to control a privacy cell driving circuit 136, a privacy display driving circuit 137, or a backlight unit driving circuit 138 of the electronic device 100.

In some embodiments, the electronic device 100 further includes a microcontroller unit 140 that is coupled to the first control circuit 110. In some embodiments, the electronic device 100 further includes a speed sensor 150, an optical sensor 160, a processing device 170, a touch sensor 180, and/or other input devices (not shown) that are coupled to the microcontroller unit 140, but the present disclosure is not limited thereto. For example, other input devices may include mice, keyboards, voice control devices, motion sensors, and the like, but the present disclosure is not limited thereto. In some embodiments, the processing device 170 may be a processor of various computers, and/or may include or be coupled to a memory device, but the present disclosure is not limited thereto. In some embodiments, the touch sensor 180 may include or be coupled to a processor, but the present disclosure is not limited thereto. In some embodiments, the touch sensor 180 may be further coupled to the privacy cell driving circuit 136 or the privacy display driving circuit 137.

Figure 2:
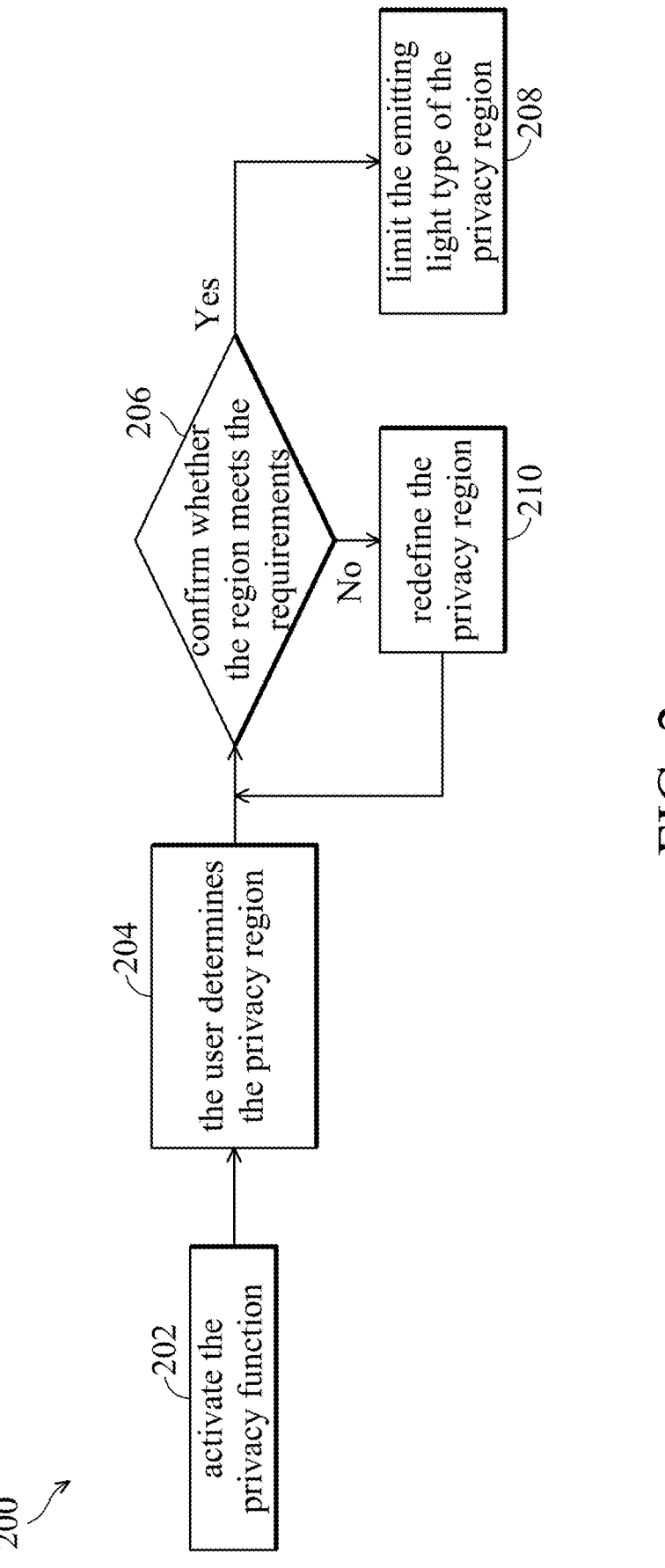
FIG. 2 illustrates a flow chart of a display method for controlling a privacy region, in accordance with some embodiments of the present disclosure.

FIG. 2 illustrates a flow chart of a display method 200 for controlling a privacy region, in accordance with some embodiments of the present disclosure. FIGS. 3A to 3D illustrate simplified diagrams of an embodiment of the display method 200 shown in FIG. 2, in accordance with some embodiments of the present disclosure. It should be noted that, the sequence of operations shown in FIG. 2 and FIGS. 3A to 3D is only an example, and the sequence of operations is not limited to the flow shown in FIG. 2 and FIGS. 3A to 3D. The display method 200 will be described below with reference to FIG. 2 and FIGS. 3A to 3D.

In operation 202 of FIG. 2, the privacy function is activated. In some embodiments, the user can activate the privacy function by clicking the icon of the application program on the touch display. For example, as shown in FIG. 3A, the user can activate the privacy function by clicking the icon 310 of the application program on the touch display 300 of the electronic device. In other embodiments, the user can activate the privacy function through sound, gestures, options on the display, mouse cursor, keyboard key combinations, and the like. However, the present disclosure is not limited thereto, and the user can use any suitable input means to activate the privacy function.

In operation 204 of FIG. 2, the location, shape, and/or size of the privacy region are determined. The privacy region can be determined by the user and can be any region. In some embodiments, the user can define the location, shape, and/or size of a required privacy region on the display through the touch function. For example, the user can define (e.g., draw) a region 320 on the touch display 300 in a manner of touching, wherein the region 320 is the required privacy region desired by the user, as shown in FIG. 3B. In other embodiments, the user can define the required privacy region on the display by controlling the mouse. However, the present disclosure is not limited thereto, and the user can use any suitable input means to define the required privacy region.

In operation 206 of FIG. 2, it is confirmed whether the region that is about to enter a privacy mode meets the requirements. In some embodiments, the electronic device may display a region that is about to enter the privacy mode on the display, and display a dialog box to ask the user whether the region meets the requirements. For example, the electronic device can display a region 330 that is about to enter the privacy mode by a dotted line on the touch display 300, and display a dialog box 340 to ask the user whether the region 330 meets the requirements, as shown in FIG. 3C. In other embodiments, the display may display the region that is about to enter the privacy mode in solid lines, grayscale, etc., but the present disclosure is not limited thereto.

When the user confirms that the region about to enter the privacy mode meets the requirements (e.g., using touch or mouse to click "Yes" in the dialog box 340 in FIG. 3C), the display method 200 proceeds to operation 208. In operation 208 of FIG. 2, the emitting light type of the privacy region is limited. In some embodiments, the electronic device limits the emitting light type of the region that is about to enter the privacy mode, so that the region enters the privacy mode and becomes a privacy region. For example, the electronic device limits the emitting light type of the region 330 of the touch display 300, so that the region 330 enters the privacy mode and becomes a privacy region 350, as shown in FIG. 3D. As used herein, the term "emitting light type" refers to the angle of light emitted outwardly (i.e., toward the user) by a display device. In some embodiments, "limiting" the emitting light type refers to limiting the angle range of light emitted outwardly from the display device, so that the position where the light can be seen is limited in a narrower area in front of the display device. In this way, people outside the narrower area cannot see the content displayed on the display device, thereby achieving the purpose of privacy.

In some embodiments, the shape of the required privacy region defined by the user in operation 204 may be the same as the shape of the privacy region actually displayed in operation 208. For example, the electronic device can limit the emitting light type of the display device strictly according to the shape of the required privacy region defined by the user, so as to make the shape of the actually displayed privacy region conform to the shape of the required privacy region defined by the user as much as possible. In other embodiments, the shape of the required privacy region defined by the user in operation 204 may be different from the shape of the privacy region actually displayed in operation 208. For example, although the region 320 defined by the user is an ellipse (see FIG. 3B), the electronic device can appropriately display the privacy region 350 (and the region 330) as a rectangle (see FIGS. 3C and 3D). In some embodiments, the electronic device may use the horizontal and vertical axes of the required privacy region defined by the user as side lengths to display the privacy region actually displayed as a rectangle, but the present disclosure is not limited thereto.

When the user confirms that the region about to enter the privacy mode does not meet the requirements (e.g., using touch or mouse to click "No" in the dialog box 340 in FIG. 3C), the display method 200 proceeds to operation 210. In operation 210 of FIG. 2, the location, shape, and/or size of the privacy region are re-determined. The operation 210 may redefine the required privacy region by the same or similar method as the operation 204 described above, and thus will not be repeated herein. After operation 210, the display method 200 proceeds to operation 206 again.

In the examples shown in FIGS. 3A to 3D, FIGS. 3A to 3C belong to a non-privacy mode (or normal mode) that has not yet entered the privacy mode, while FIG. 3D belongs to the privacy mode, but the present disclosure is not limited thereto. For example, in the example shown in FIG. 3C, the region 330 can be made into the privacy mode while the dialog box 340 is displayed.

Figure 4:
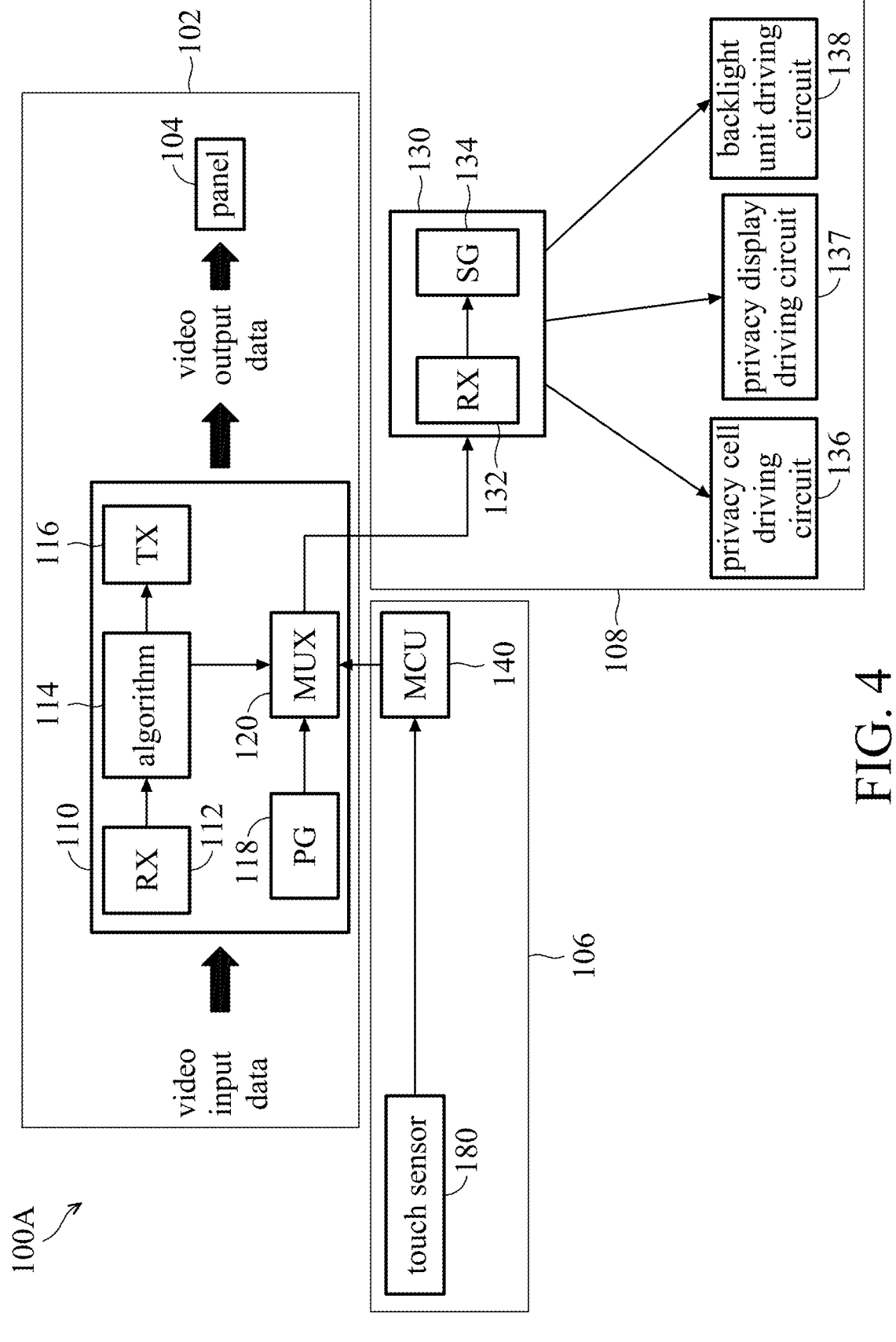
FIG. 4 illustrates a schematic diagram of an electronic device including a display unit, in accordance with some embodiments of the present disclosure.

FIG. 4 illustrates a schematic diagram of an electronic device 100A including a display unit, in accordance with some embodiments of the present disclosure. In some embodiments, the electronic device 100A may be used to implement the display method 200 to control the privacy region, but the present disclosure is not limited thereto. The electronic device 100A may be similar to the electronic device 100 previously described with reference to FIG. 1, and the same reference numerals represent the same or similar elements, and thus are not repeated herein.

Referring to FIG. 4, the electronic device 100A includes a display unit 102, a touch unit 106, and a light control unit 108. The display unit 102 is configured to display images, and may include the panel 104 and the first control circuit 110. The display unit may include a self-luminous display unit and a non-self-luminous display unit. The touch unit 106 is electrically connected to the display unit 102 and may include a touch sensor 180. The light control unit 108 is electrically connected to the touch unit 106 and may include the second control circuit 130. In some embodiments, the light control unit 108 may include one or more of a privacy cell, a privacy emitting light array, a privacy emitting light module, or a privacy filter, but the present disclosure is not limited thereto. In some embodiments, the privacy cell, the privacy emitting light array, the privacy emitting light module, or the privacy filter may be controlled by the privacy cell driving circuit 136, the privacy display driving circuit 137, or the backlight unit driving circuit 138. The privacy cell, the privacy emitting light array, the privacy emitting light module, and the privacy filter will be described in more detail below.

The touch unit 106 of the electronic device 100A may be used to determine the privacy region. In some embodiments, the user can define the required privacy region by touching through the touch sensor 180 of the touch unit 106, but the present disclosure is not limited thereto. In other embodiments, the user can define the required privacy region through other suitable input means such as a mouse. Then, the information about the required privacy region can be integrated by a processor included in or coupled to the touch sensor 180 and transmitted to the microcontroller unit 140. Afterward, the microcontroller unit 140 transmits the information about the required privacy region to the first control circuit 110 of the display unit 102. The information about the required privacy region is operated by the algorithm 114, and then privacy data including the required privacy region will be generated. The multiplexer 120 may select the privacy data generated by the algorithm 114 and outputs the privacy data to the second control circuit 130 of the light control unit 108.

After receiving the privacy data, the second control circuit 130 outputs the timing and data to the privacy cell driving circuit 136, the privacy display driving circuit 137, or the backlight unit driving circuit 138 according to the privacy data, so as to control the emitting light type of the privacy cell, the privacy emitting light array, or the privacy emitting light module to be within a viewing angle range. By controlling the emitting light type of the privacy cell, the privacy emitting light array, or the privacy emitting light module in the required privacy region, it can make the required privacy region enter the privacy mode and become the privacy region.

The control of the emitting light type limits the emitting light angle of the privacy region of the display unit, so that the emitting light intensity is concentrated in a particular angle range. In some embodiments, the viewing angle is the angle between a line connecting the user's eyes to the panel of the display unit and the normal line of the panel. For example, the viewing angle may be the angle between a line connecting the user's eyes to the center of the privacy region and the normal line extending outward from the center of the privacy region. In these embodiments, when the user is located directly in front of the panel of the display unit, the viewing angle may be 0 degrees or close to 0 degrees. In alternative embodiments, the viewing angle may be the angle between a line connecting the user's eyes to the panel of the display unit and the plane of the panel. In these embodiments, when the user is located directly in front of the panel of the display unit, the viewing angle may be 90 degrees or close to 90 degrees.

In some embodiments, the privacy mode of the privacy region can be released by the following method. A switching control signal can be sent by the microcontroller unit 140 to make the multiplexer 120 select the pattern generator 118 to output the pattern to the second control circuit 130. Then, the privacy cell, the privacy emitting light array, or the privacy emitting light module driven by the second control circuit 130 will stop limiting the emitting light type, so that the privacy region is released from the privacy mode. As a result, the entire display unit will enter the non-privacy mode. It should be noted that, the method described above is only an example for releasing the privacy mode of the privacy region, and the present disclosure is not limited thereto. Any suitable method can be used to release the privacy mode of the privacy region.

Figure 5:
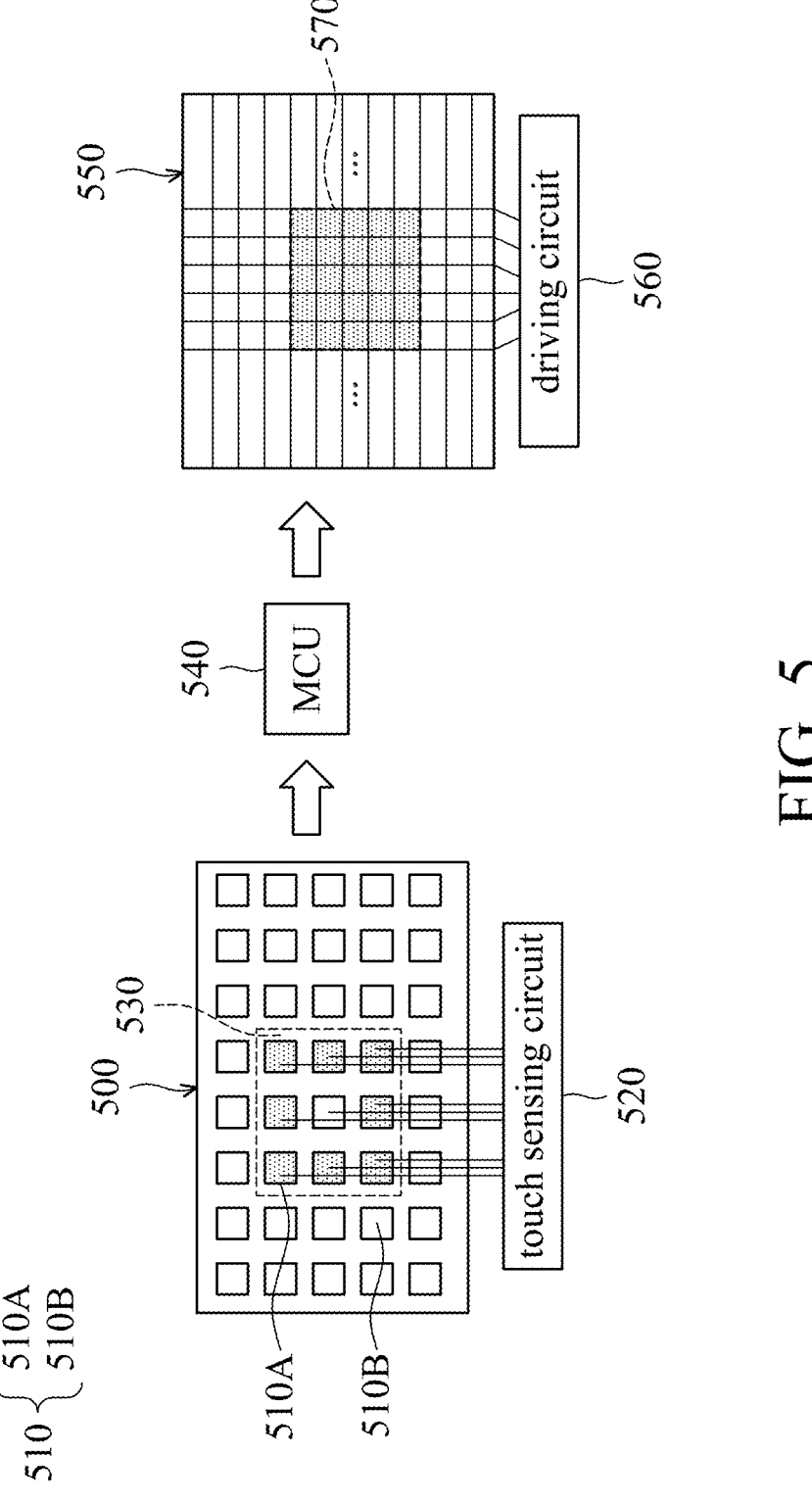
FIG. 5 is a schematic diagram that illustrates the interaction between a touch sensor and a light control unit, in accordance with some embodiments of the present disclosure.

FIG. 5 is a schematic diagram that illustrates the interaction between a touch sensor and a light control unit when the privacy mode is activated, in accordance with some embodiments of the present disclosure. In some embodiments, a touch sensor (e.g., the touch sensor 180) may include a touch sensing layer 500, a touch sensing circuit 520, and/or a processor (not shown), but the present disclosure is limited thereto. In some embodiments, the touch sensing layer 500 may include indium tin oxide blocks (ITO blocks) or a metal mesh (metal mesh), but the present disclosure is not limited thereto. In some embodiments, the touch sensing layer 500 may include sensing units 510 that are connected to the touch sensing circuit 520.

In some embodiments, when the user defines the required privacy region in a manner of touching, the sensing units 510 touched by the user will be activated and marked as sensing units 510A, while the sensing units 510 that are not touched remain non-activated and are marked as sensing units 510B in FIG. 5. In some embodiments, the activated sensing units 510A constitute the required privacy region 530 of the user. After sensing the required privacy region 530 constituted by the sensing units 510A, the touch sensing circuit 520 transmits the information related to the required privacy region 530 to the microcontroller unit 540. The microcontroller unit 540 is, for example, the microcontroller unit 140 shown in FIG. 4. Then, the microcontroller unit 540 transmits the information related to the required privacy region 530 to the light control unit 550.

In some embodiments, the light control unit 550 includes the privacy cell, the privacy emitting light array, or the privacy emitting light module, but the present disclosure is not limited thereto. In some embodiments, the light control unit 550 is such as the light control unit 108 described above, and a driving circuit 560 is such as the privacy cell driving circuit 136, the privacy display driving circuit 137, or the backlight unit driving circuit 138 described above, but the present disclosure is not limited thereto. In some embodiments, after receiving the information related to the required privacy region 530, the driving circuit 560 of the light control unit 550 will control the emitting light type of the light control unit 550 to limit the emitting light angle in the required privacy region 530. As a result, the required privacy region 530 will enter the privacy mode and become the privacy region 570.

Figure 6:
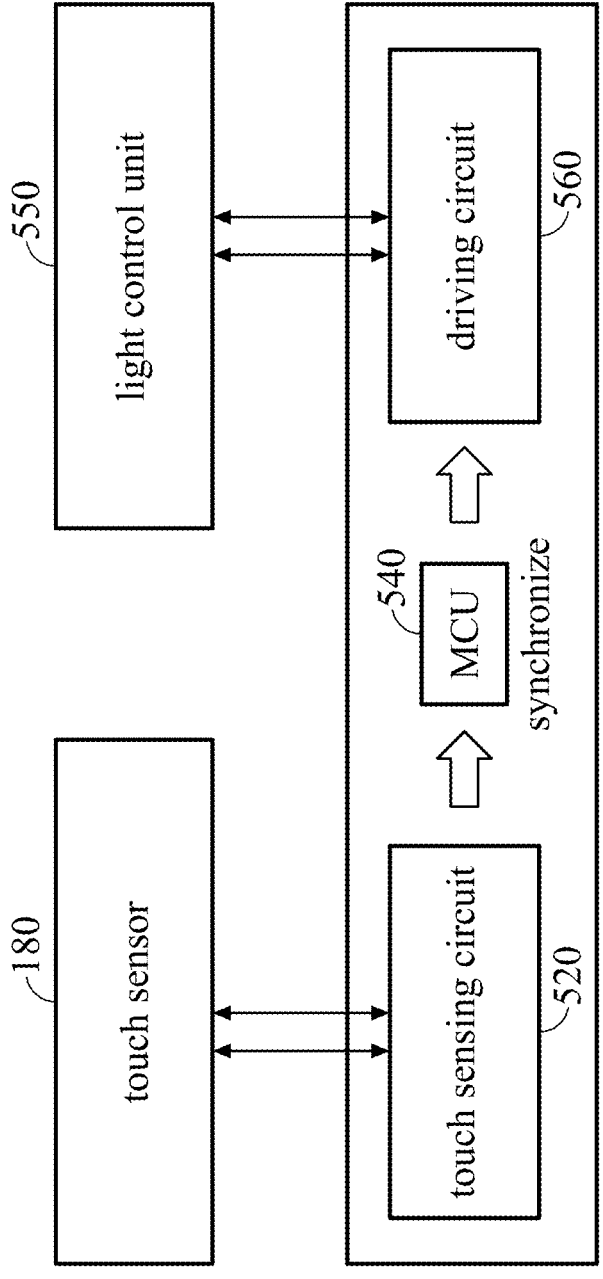
FIG. 6 is a schematic diagram that illustrates the information transmission between the touch sensor and the light control unit shown in FIG. 5.

FIG. 6 is a schematic diagram that illustrates the information transmission between the touch sensor and the light control unit shown in FIG. 5, in accordance with some embodiments of the present disclosure. Referring to FIG. 6, when the user defines the required privacy region 530 by touching the touch sensor 180, the touch sensing circuit 520 receives the information of the required privacy region 530 constituted after being sensed by the sensing units 510A on the touch sensing layer 500. Then, the touch sensing circuit 520 transmits the information related to the required privacy region 530 to the microcontroller unit 540. Afterward, the microcontroller unit 540 synchronizes the information related to the required privacy region 530 and transmits it to the driving circuit 560 of the light control unit 550. Then, the driving circuit 560 controls the emitting light type of the light control unit 550 to make the required privacy region 530 become the privacy region 570.

Figure 7:
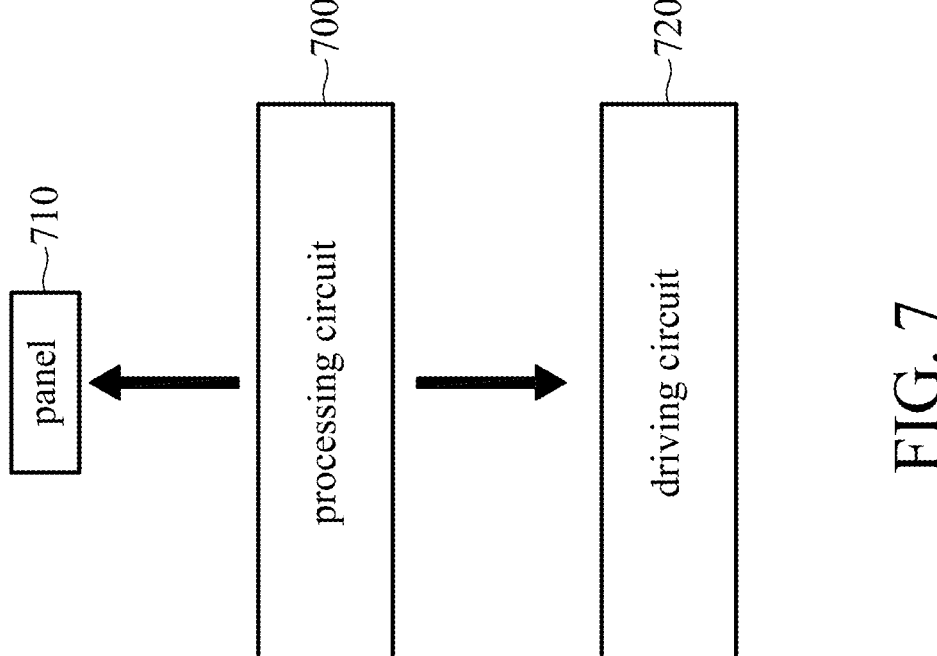
FIG. 7 illustrates a schematic diagram of an electronic device, in accordance with some embodiments of the present disclosure.

FIG. 7 illustrates a schematic diagram of an electronic device 100B, in accordance with some embodiments of the present disclosure. In some embodiments, the electronic device 100B may be used to implement the display method 200 to control the privacy region, but the present disclosure is not limited thereto. In some embodiments, the electronic device 100B may include a processing circuit 700, a panel 710 electrically connected to the processing circuit 700, and a driving circuit 720 electrically connected to the processing circuit 700. In some embodiments, the processing circuit 700 may include a touch sensor and/or a processor. In some embodiments, the processor adopts a touch and display driver integration (TDDI) IC architecture, such that the processor can control the touch sensor and the driving circuit 720. In some embodiments, the driving circuit 720 is a driving circuit of a light control unit.

In some embodiments, the touch sensor of the processing circuit 700 can sense the required privacy region defined by the user. Then, the processor of the processing circuit 700 can drive the driving circuit 720 of the light control unit according to the information of the required privacy region, so as to make the light control unit controlled by the driving circuit 720 limit the emitting light type of the required privacy region. As a result, the required privacy region will enter the privacy mode and become the privacy region.

Figure 8:
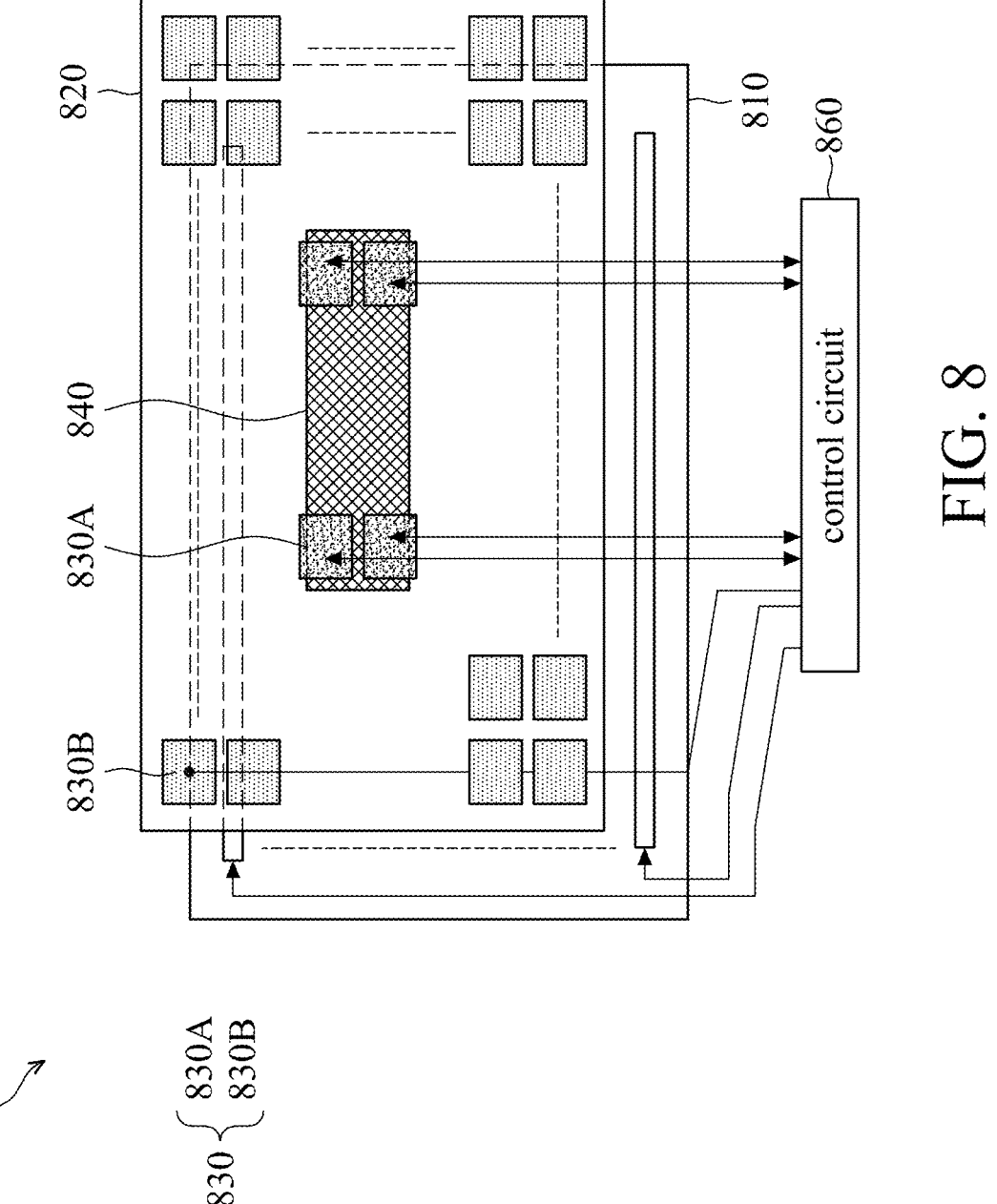
FIG. 8 illustrates a schematic diagram of a privacy cell, in accordance with some embodiments of the present disclosure.

FIG. 8 illustrates a schematic diagram of a privacy cell 800, in accordance with some embodiments of the present disclosure. In some embodiments, the privacy cell 800 can be applied to the architecture shown in FIG. 7, but the present disclosure is not limited thereto. In some embodiments, the privacy cell 800 includes a first substrate 810, a second substrate 820, a control circuit 860, and a liquid-crystal layer (not shown) disposed between the first substrate 810 and the second substrate 820.

In some embodiments, the first substrate 810 includes a thin film transistor (TFT) array layer. In some embodiments, each thin film transistor is connected to a corresponding pixel electrode, but the present disclosure is not limited thereto. In some embodiments, the second substrate 820 includes a common electrode layer, and the common electrode layer can be applied to a privacy driving path and a touch sensing path. In some embodiments, the common electrode layer may be divided into a plurality of sensing units 830, such as N*M sensing units, where N and M are positive integers greater than 1. In some embodiments, the control circuit 860 is electrically connected to components (e.g., thin film transistors, pixel electrodes, sensing units, and the like) in the first substrate 810 and the second substrate 820, such that the control circuit 860 provides control signals during a touch sensing phase and a display phase, and senses the sensing units 830 during the touch sensing phase.

In some embodiments, when the user defines the required privacy region in a manner of touching, the sensing units 830 touched by the user will be activated, and the activated sensing units 830 constitutes a required privacy region 840 of the user. In FIG. 8, the sensing units 830 inside the required privacy region 840 are labeled as sensing units 830A, and the sensing units 830 outside the required privacy region 840 are labeled as sensing units 830B. After sensing the required privacy region 840, the control circuit 860 can make the required privacy region 840 enter the privacy mode and become the privacy region.

In some embodiments, in the privacy mode, the control circuit 860 can enable the privacy driving path and disable the touch sensing path during the display phase. For example, the control circuit 860 can enable the sensing units 830A inside the required privacy region 840 and the pixel electrodes corresponding to the sensing units 830A to control the arrangement of the liquid crystals between the sensing units 830A and the pixel electrodes. In this way, the emitting light type in the required privacy region 840 can be controlled, such that the required privacy region 840 enters the privacy mode and becomes the privacy region. At the same time, the control circuit 860 can disable the touch sensing path, such that the sensing units 830 will not be used to sense touching behaviors during the display phase. In some embodiments, in the normal mode (e.g., before entering the privacy mode or after releasing the privacy mode), the control circuit 860 can enable the touch sensing path during the touch sensing phase, such that the sensing units 830 are used to sense touching behaviors.

Figure 9:
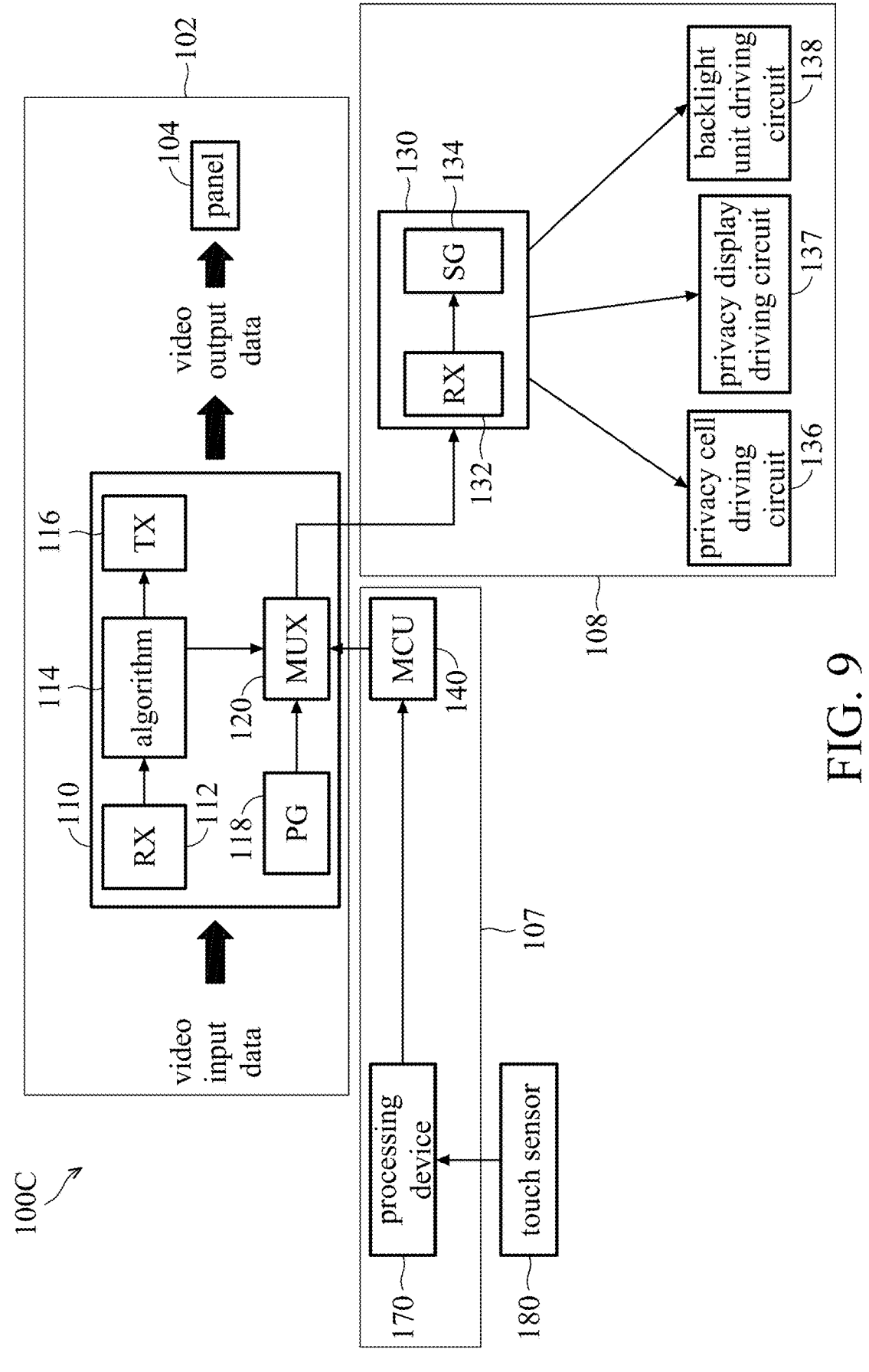
FIG. 9 illustrates a schematic diagram of an electronic device including a display unit, in accordance with some embodiments of the present disclosure.

FIG. 9 illustrates a schematic diagram of an electronic device 100C including a display unit, in accordance with some embodiments of the present disclosure. In some embodiments, the electronic device 100C may be used to implement the display method 1000 shown below with reference to FIG. 10 to control the privacy region, but the present disclosure is not limited thereto. The electronic device 100C may be similar to the electronic device 100 previously described with reference to FIG. 1, and the same reference numerals represent the same or similar elements, and thus are not repeated herein.

Referring to FIG. 9, the electronic device 100C includes the display unit 102, a processing unit 107, and a light control unit 108. The display unit 102 is configured to display images, and may include the panel 104 and the first control circuit 110. The display unit 102 may include a self-luminous display unit and a non-self-luminous display unit. The processing unit 107 is electrically connected to the display unit 102 and may include a processing device 170. The light control unit 108 is electrically connected to the processing unit 107 and may include the second control circuit 130. In some embodiments, the light control unit 108 may include one or more of the privacy cell, the privacy emitting light array, the privacy emitting light module, or the privacy filter, but the present disclosure is not limited thereto. In some embodiments, the privacy cell, the privacy emitting light array, the privacy emitting light module, or the privacy filter may be controlled by the privacy cell driving circuit 136, the privacy display driving circuit 137, or the backlight unit driving circuit 138. In some embodiments, the processing device 170 may be a processor of various computers, and/or may include or be coupled to a memory device, but the present disclosure is not limited thereto.

The processing unit 107 of the electronic device 100C may include or be electrically connected to an input device (e.g., touch sensor 180). In some embodiments, the user can activate the privacy function through the touch sensor 180 connected to the processing device 170, but the present disclosure is not limited thereto. In other embodiments, the user can activate the privacy function through other suitable input devices such as a mouse or a keyboard. After activating the privacy function, the processing device 170 may transmit the information of a desired privacy window that is predefined (e.g., stored in a memory device) to the microcontroller unit 140. Then, the microcontroller unit 140 transmits the information of the desired privacy window to the first control circuit 110 of the display unit 102. After the information of the desired privacy window is operated by the algorithm 114, the privacy data including the desired privacy window will be generated. The multiplexer 120 selects the privacy data generated by the algorithm 114 and outputs the privacy data to the second control circuit 130 of the light control unit 108.

After receiving the privacy data, the second control circuit 130 outputs the timing and data according to the privacy data to the privacy cell driving circuit 136, the privacy display driving circuit 137, or the backlight unit driving circuit 138, so as to control the emitting light type of the privacy cell, the privacy emitting light array, or the privacy emitting light module to be within a viewing angle range. By controlling the emitting light type of the privacy cell, the privacy emitting light array, or the privacy emitting light module in the desired privacy window, it can make the desired privacy window enter the privacy mode and become the privacy window.

In some embodiments, the privacy mode of the privacy window can be released by the following method. A switching control signal can be sent by the microcontroller unit 140 to make the multiplexer 120 select the pattern generator 118 to output the pattern to the second control circuit 130. Then, the privacy cell, the privacy emitting light array, or the privacy emitting light module driven by the second control circuit 130 will stop limiting the emitting light type, so that the privacy window is released from the privacy mode. As a result, the entire display unit will enter the non-privacy mode. It should be noted that, the method described above is only an example for releasing the privacy mode of the privacy window, and the present disclosure is not limited thereto. Any suitable method can be used to release the privacy mode of the privacy window.

Figure 10:
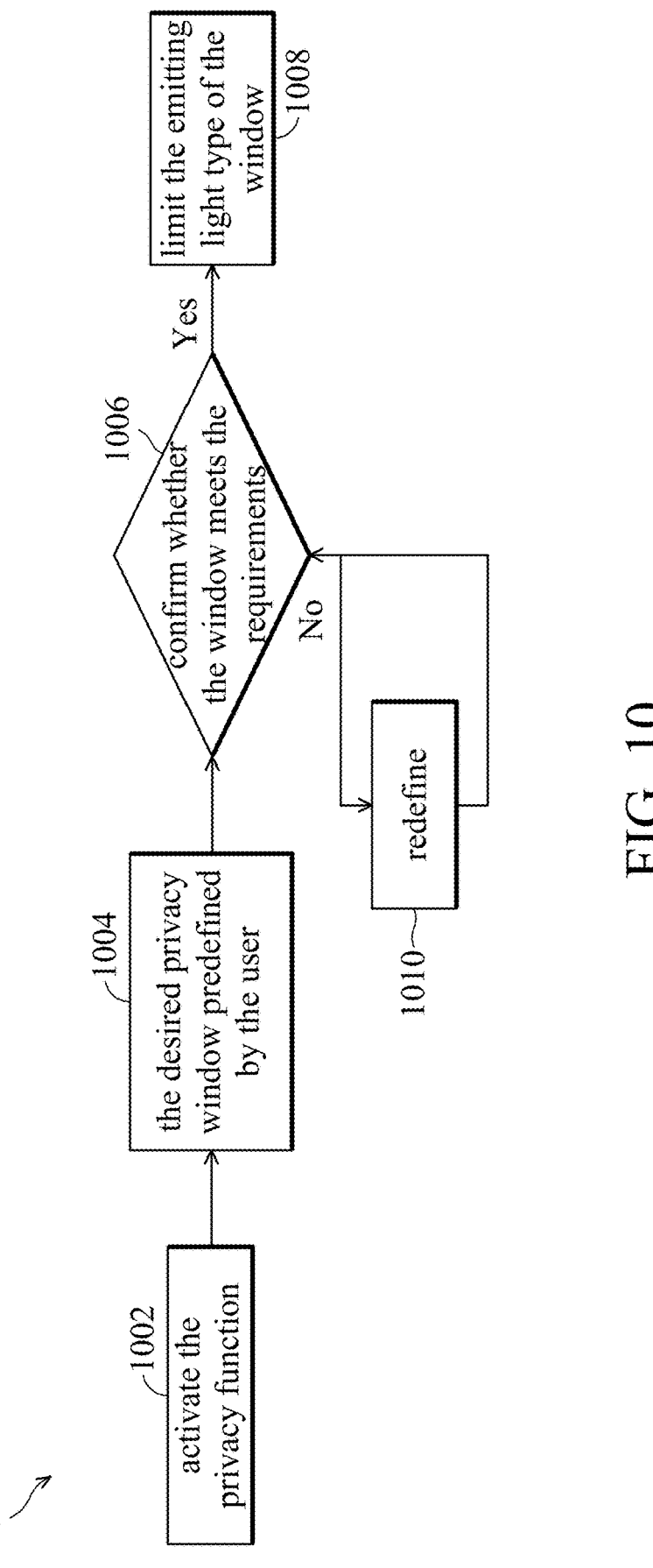
FIG. 10 illustrates a flow chart of a display method for controlling a privacy window, in accordance with some embodiments of the present disclosure.
Figures 11A, 11B, 11C:
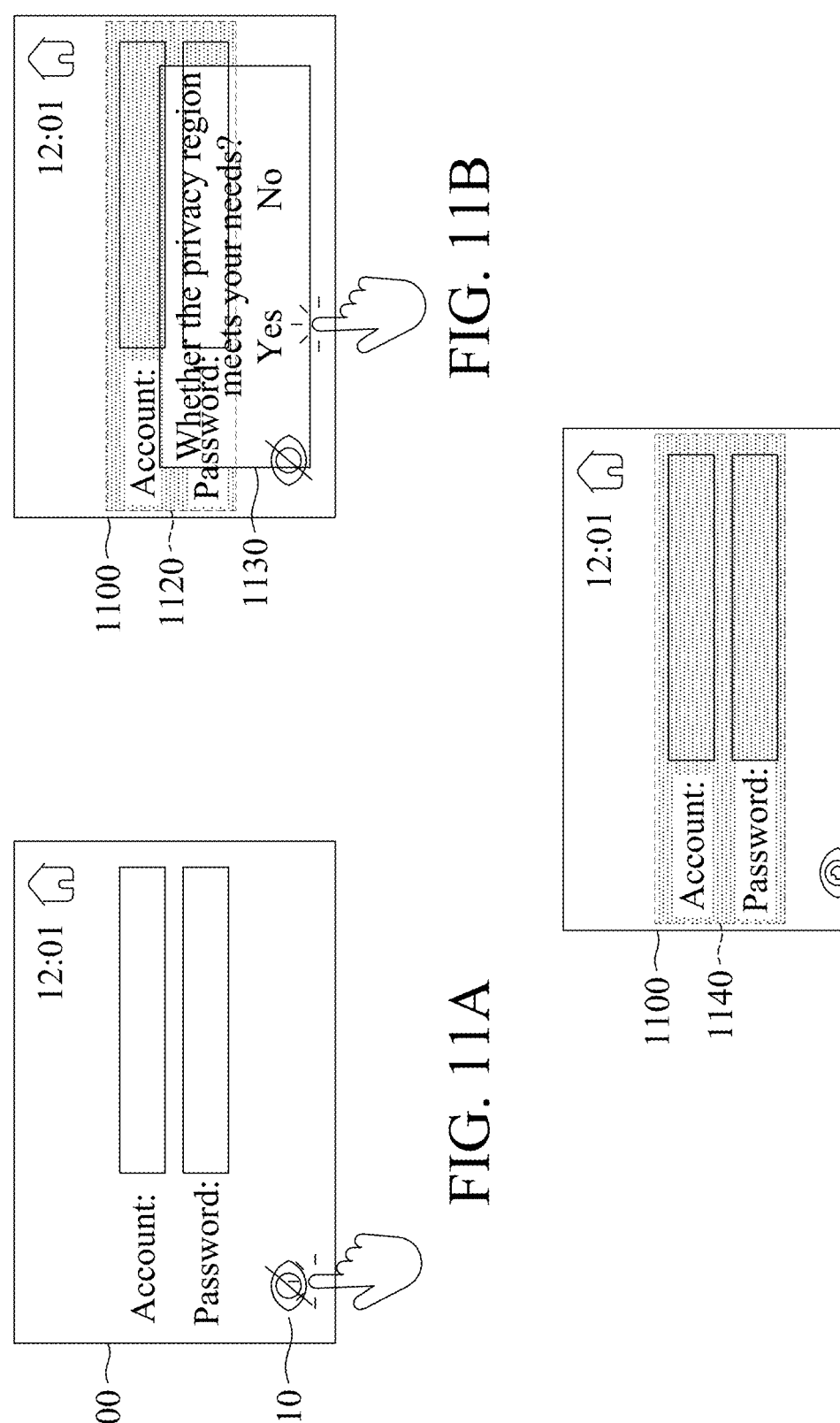
FIGS. 11A to 11C illustrate simplified diagrams of an embodiment of the display method shown in FIG. 10, in accordance with some embodiments of the present disclosure.

FIG. 10 illustrates a flow chart of a display method 1000 for controlling a privacy window, in accordance with some embodiments of the present disclosure. FIGS. 11A to 11C illustrate simplified diagrams of an embodiment of the display method 1000 shown in FIG. 10, in accordance with some embodiments of the present disclosure. It should be noted that, the sequence of operations shown in FIG. 10 and FIGS. 11A to 11C is only an example, and the sequence of operations is not limited to the flow shown in FIG. 10 and FIGS. 11A to 11C. The display method 1000 will be described below with reference to FIG. 10 and FIGS. 11A to 11C.

In operation 1002 of FIG. 10, the privacy function is activated. In some embodiments, the user can activate the privacy function by clicking the icon of the application program on the touch display. For example, as shown in FIG. 11A, the user can activate the privacy function by clicking the icon 1110 of the application program on the touch display 1100 of the electronic device. In other embodiments, the user can activate the privacy function through sound, gestures, options on the display, mouse cursor, keyboard key combinations, and the like. However, the present disclosure is not limited thereto, and the user can use any suitable input means to activate the privacy function.

In operation 1004 of FIG. 10, a desired privacy window that is predefined is displayed. In some embodiments, users can predefine the predefined privacy requirement in the processing device according to their own requirements to predefine the desired privacy window they want, and the desired privacy window is displayed by the display device after the privacy function is activated. For example, after the privacy function is activated, the touch display 1100 displays a desired privacy window 1120 predefined by the user, as shown in FIG. 11B. In some embodiments, the electronic device may display the desired privacy window 1120 by a dotted line on the touch display 1100, as shown in FIG. 11B. In other embodiments, the touch display 1100 may display the desired privacy window 1120 by a solid line, grayscale, etc., but the present disclosure is not limited thereto. It should be noted that, the privacy window and the desired privacy window may also be referred to as the privacy region and the desired privacy region herein.

In operation 1006 of FIG. 10, it is confirmed whether the desired privacy window that is about to enter the privacy mode meets the requirements. In some embodiments, the electronic device may display a dialog box on the display to ask the user whether the desired privacy window that is currently displayed meets the requirements. For example, the electronic device may display a dialog box 1130 on the touch display 1100 to ask the user whether the desired privacy window 1120 meets the requirements, as shown in FIG. 11B. In some embodiments, operations 1004 and 1006 can be performed concurrently.

In some embodiments, the desired privacy window may be a window of an application program, such as a Microsoft office series application program or a web browser. In some embodiments, the desired privacy window may be a predefined region. For example, for an automotive display, the desired privacy window may be the center information display (CID) and/or the region in front of the passenger seat, but the present disclosure is not limited thereto. For example, for an ATM or a kiosk, the desired privacy window may be the region for entering a password, but the present disclosure is not limited thereto.

In some embodiments, the desired privacy window can be predefined by inputting keywords. When the electronic device detects a predefined keyword, the window related to the keyword can be regarded as a desired privacy window. For example, keywords used for the desired privacy window may include accounts, passwords, payment information, confidential customer information, and the like. However, the present disclosure is not limited thereto, and users can input any keywords according to their own privacy requirements.

In some embodiments, the desired privacy window can have been predefined in the application program, and/or the user can manually input keywords to predefine the desired privacy window, but the present disclosure is not limited thereto. In some embodiments, the predefinition of the desired privacy window can be implemented in a processing device or a computer, and the information of the desired privacy window is stored in a memory device, but the present disclosure is not limited thereto. In this way, when the privacy function is activated, the desired privacy window can be displayed according to the predefined desired privacy windows.

When the user confirms that the desired privacy window about to enter the privacy mode meets the requirements (e.g., e.g., using touch or mouse to click "Yes" in the dialog box 1130 in FIG. 11B), the display method 1000 proceeds to operation 1008. In operation 1008 of FIG. 10, the emitting light type of the desired privacy window is limited. In some embodiments, the electronic device limits the emitting light type of the desired privacy window that is about to enter the privacy mode, so that the desired privacy window enters the privacy mode and becomes a privacy window. For example, the electronic device limits the emitting light type of the desired privacy window 1120 of the touch display 1100, so that the desired privacy window 1120 enters the privacy mode and becomes a privacy window 1140, as shown in FIG. 11C.

When the user confirms that the desired privacy window about to enter the privacy mode does not meet the requirements (e.g., using touch or mouse to click "No" in the dialog box 1130 in FIG. 11B), the display method 1000 proceeds to operation 1010. In operation 1010 of FIG. 10, the desired privacy window is redefined. The operation 1010 may reselect the desired privacy window according to the predefined desired privacy windows. For example, there may be a plurality of predefined desired privacy windows, and the operation 1004 may select one of the predefined desired privacy windows and display it. When the user confirms that the one of the predefined desired privacy windows does not meet the requirements in operation 1006, the display method 1000 will select another one of the predefined desired privacy windows in operation 1010. After operation 1010, the display method 1000 proceeds to operation 1006 again.

In some embodiments, the privacy function can be automatically activated when a keyword is detected. In some embodiments, when a keyword is detected, the desired privacy window can be automatically entered into the privacy mode to become the privacy window. In some embodiments, the display method 1000 can be implemented in the form of a software, and the electronic device can enable the privacy function through the software, but the present disclosure is not limited thereto.

In the examples shown in FIGS. 11A to 11C, FIGS. 11A to 11B belong to the non-privacy mode (or normal mode) that has not yet entered the privacy mode, while FIG. 11C belongs to the privacy mode, but the present disclosure is not limited thereto. For example, in the example shown in FIG. 11B, the desired privacy window 1120 can be made into the privacy mode while the dialog box 1130 is displayed.

Figure 12B:
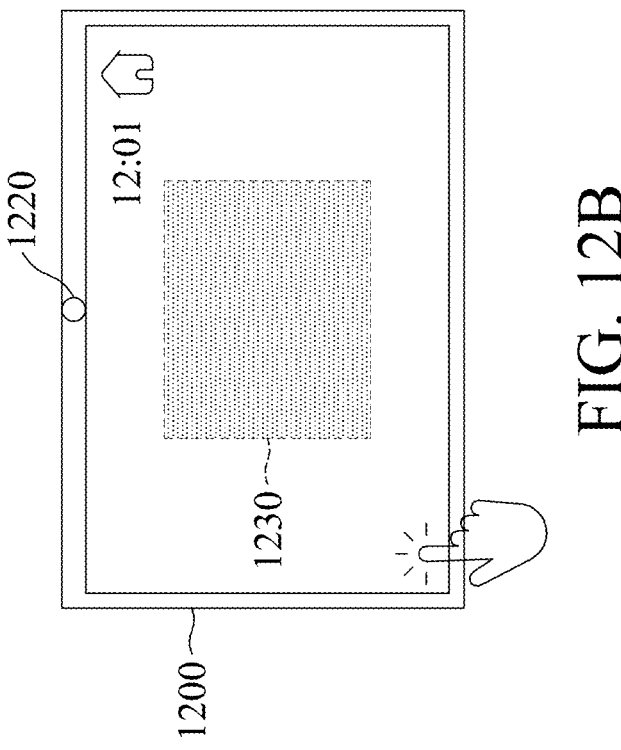
FIGS. 12A to 12B illustrate simplified diagrams of an embodiment of the display method shown in FIG. 13, in accordance with some embodiments of the present disclosure.
Figure 12A:
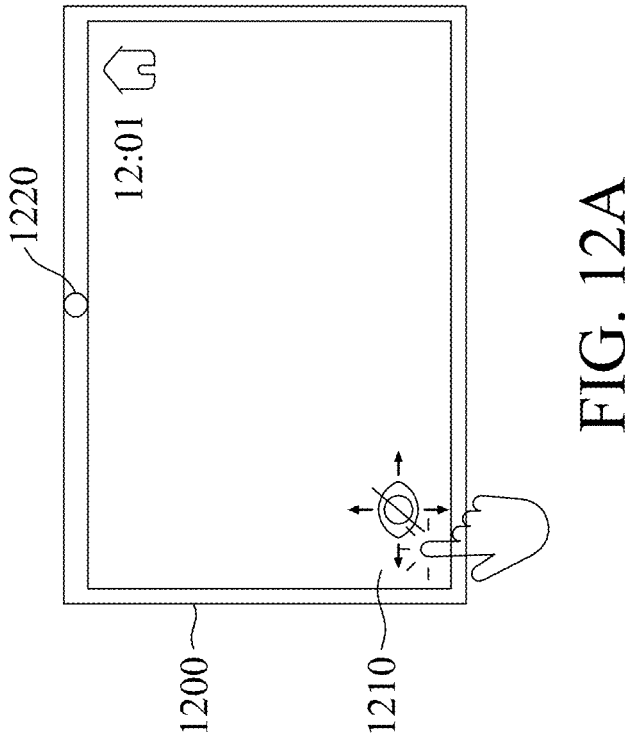
Figure 13:
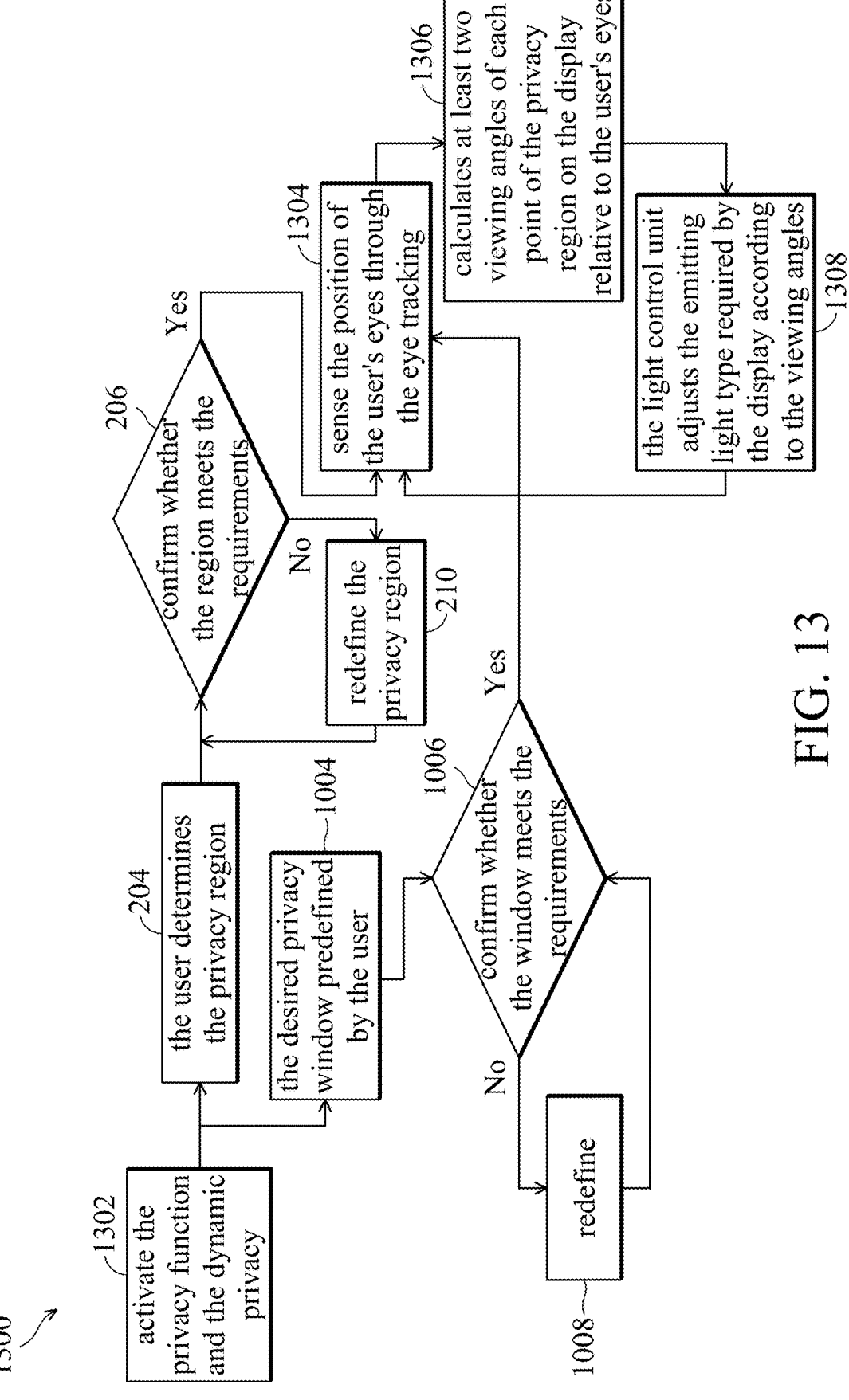
FIG. 13 illustrates a flow chart of a display method for controlling a privacy window, in accordance with some embodiments of the present disclosure.

FIGS. 12A to 12B illustrate simplified diagrams of an embodiment of the display method 1300 shown in FIG. 13 below, in accordance with some embodiments of the present disclosure. FIG. 13 illustrates a flow chart of the display method 1300 for controlling a privacy window, in accordance with some embodiments of the present disclosure. The display method 1300 will be described below with reference to FIGS. 12A to 12B and FIG. 13 simultaneously.

In operation 1302 of FIG. 13, the privacy function and a dynamic privacy are activated. In some embodiments, the user can activate the privacy function and the dynamic privacy by clicking the icon of the application program on the touch display. For example, as shown in FIG. 12A, the user can activate the privacy function and the dynamic privacy by clicking the icon 1210 of the application program on the touch display 1200 of the electronic device. In other embodiments, the user can activate the privacy function and the dynamic privacy through sound, gestures, options on the display, mouse cursor, keyboard key combinations, and the like. However, the present disclosure is not limited thereto, and the user can use any suitable input means to activate the privacy function and the dynamic privacy.

After operation 1302, the display method 1300 may determine the privacy region about to enter the privacy mode by way similar to the display method 200 and the display method 1000. For example, the display method 1300 may determine the privacy region (e.g., the privacy region 350) to enter the privacy mode through operations 204, 206, and 210 of the display method 200, as shown in FIG. 13. Alternatively, the display method 1300 may determine the privacy region (e.g., the privacy window 1140) to enter the privacy mode through operations 1004, 1006, and 1010 of the display method 1000, as shown in FIG. 13. It should be noted that, for the purpose of simplicity, the privacy window is also referred to as the privacy region in the description with reference to FIGS. 12A to 12B and FIG. 13.

Referring to FIG. 13, after the privacy region is determined in operation 206 or operation 1006, the display method 1300 proceeds to operation 1304. In operation 1304, the electronic device performs eye tracking through an optical sensor to sense the position of the user's eyes. For example, eye tracking can be performed through the optical sensor 1220 on the touch display 1200 to sense the position of the user's eyes, as shown in FIG. 12A. In some embodiments, the optical sensor 1220 may be a camera, a charge coupled device, an infrared (IR) sensor, and the like, but the present disclosure is not limited thereto.

In operation 1306 of FIG. 13, the electronic device calculates at least two viewing angles of each point of the privacy region on the display relative to the user's eyes. Next, in operation 1308 of FIG. 13, the light control unit (e.g., the light control unit 108) of the electronic device adjusts the emitting light type required by the display according to the viewing angles calculated in operation 1306, so as to make the light in the privacy region send toward the user's eyes, such that the light intensity is concentrated in the range of the at least two viewing angles of the user's eyes. In this way, only the region where the user is located can clearly watch the content displayed on the display, regardless of whether the user is located directly in front of the display. On the other hand, other people whose position and viewing angles are different from the user cannot watch the content displayed on the display. For example, the light control unit of the electronic device controls the emitting light type in the privacy region 1230, so as to make the privacy region 1230 enter the privacy mode, as shown in FIG. 12B. In the embodiment shown in FIG. 12B, the light control unit make the light in the privacy region 1230 be sent toward the user's eyes, so that people other than the user cannot watch the content displayed on the touch display 1200, thereby causing the privacy region 1230 to enter the privacy mode.

After operation 1308, the method 1300 will proceed operation 1304 again, and perform operations 1304, 1306, and 1308 repeatedly in the order. Therefore, method 1300 can continuously adjust the emitting light type required by the display as the position of the user's eyes changes, so that the light in the privacy region is continuously sent toward the user's eyes. In this way, no matter how the user changes the position and/or posture, the user can clearly watch the content displayed on the display, and the privacy function is still effective.

Figure 14:
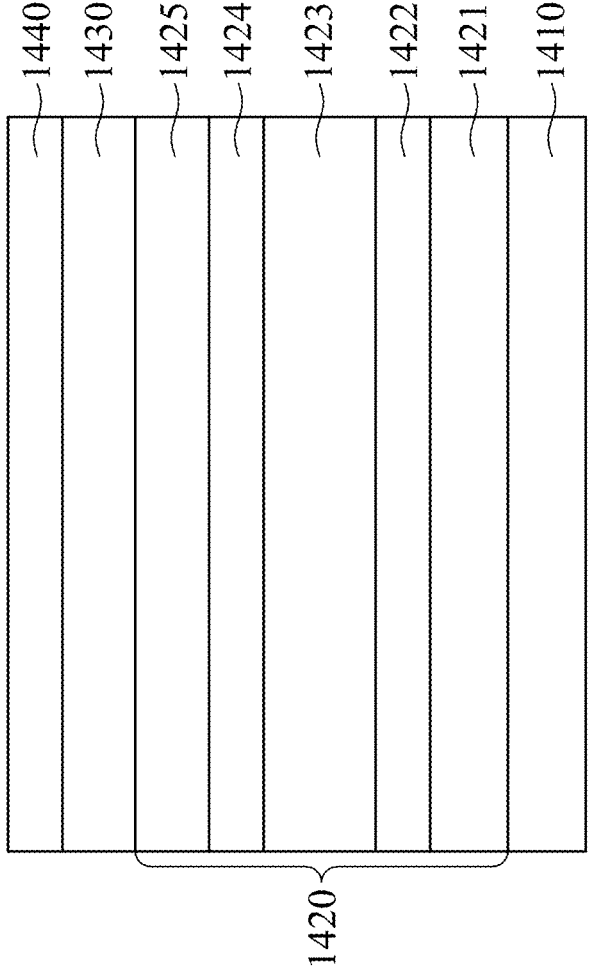
FIG. 14 illustrates a schematic diagram of a privacy display, in accordance with some embodiments of the present disclosure.
Figure 14:

FIG. 14 illustrates a schematic diagram of a privacy display 1400, in accordance with some embodiments of the present disclosure. Referring to FIG. 14, the privacy display 1400 includes a backlight unit 1410, a privacy cell 1420, a display panel 1430, and a touch sensor 1440. In some embodiments, the display panel 1430 may be disposed above the privacy cell 1420, as shown in FIG. 14, but the present disclosure is not limited thereto. In other embodiments, the display panel 1430 may be disposed between the privacy cell 1420 and the backlight unit 1410. In some embodiments, the privacy cell 1420 includes a substrate 1421, an active privacy electrode layer 1422 over the substrate 1421, a liquid-crystal layer 1423 over the active privacy electrode layer 1422, a common electrode layer 1424 over the liquid-crystal layer 1423, and a substrate 1425 over the common electrode layer 1424. In some embodiments, the privacy cell 1420 may be a part of the light control unit of the electronic device. In some embodiments, the privacy display may further include two other privacy cells (not shown), and the three privacy cells are disposed between the backlight unit 1410 and the display panel 1430. In addition, the backlight unit 1410 may also include one or more optical films, and the optical films may include, for example, brightness enhancement film (BEF) and light control film (LCF), but the present disclosure is not limited thereto. In some embodiments, the light control film may be disposed between the brightness enhancement film and the privacy cell, but the present disclosure is not limited thereto.

In some embodiments, the light emitted by the backlight unit 1410 is collimated light. In some embodiments, the driving circuit of the privacy display 1400 or the privacy cell 1420 can drive the active privacy electrode layer 1422 and the common electrode layer 1424, so as to control the arrangement of liquid-crystal molecules in the liquid-crystal layer 1423 that is between the active privacy electrode layer 1422 and the common electrode layer 1424. In the privacy mode, in the portion of the liquid-crystal layer 1423 corresponding to the privacy region, the arrangement of liquid-crystal molecules can be controlled, so as to make the collimated light emitted by the backlight unit 1410 does not diverge when passing through the liquid-crystal layer 1423. As a result, the emitting light type of the privacy region will be limited in a certain angle range, thereby achieving the privacy effect. In the non-privacy mode, in the liquid-crystal layer 1423, the arrangement of liquid-crystal molecules can be controlled, so as to make the collimated light emitted by the backlight unit 1410 diverge when passing through the liquid-crystal layer 1423. Similarly, in the non-privacy region, in the portion of the liquid-crystal layer 1423 corresponding to the non-privacy region, the arrangement of liquid-crystal molecules can be controlled, so as to make the collimated light emitted by the backlight unit 1410 diverge when passing through the liquid-crystal layer 1423. In this way, the visible angle (e.g., the viewing angle range that people can watch the content on the display) of the non-privacy region or non-privacy mode can be increased. In some embodiments, the display panel 1430 may be a self-luminous panel. In these embodiments, the display panel 1430 may be disposed below the privacy cell 1420, and the backlight unit 1410 may be omitted.

Figure 15:
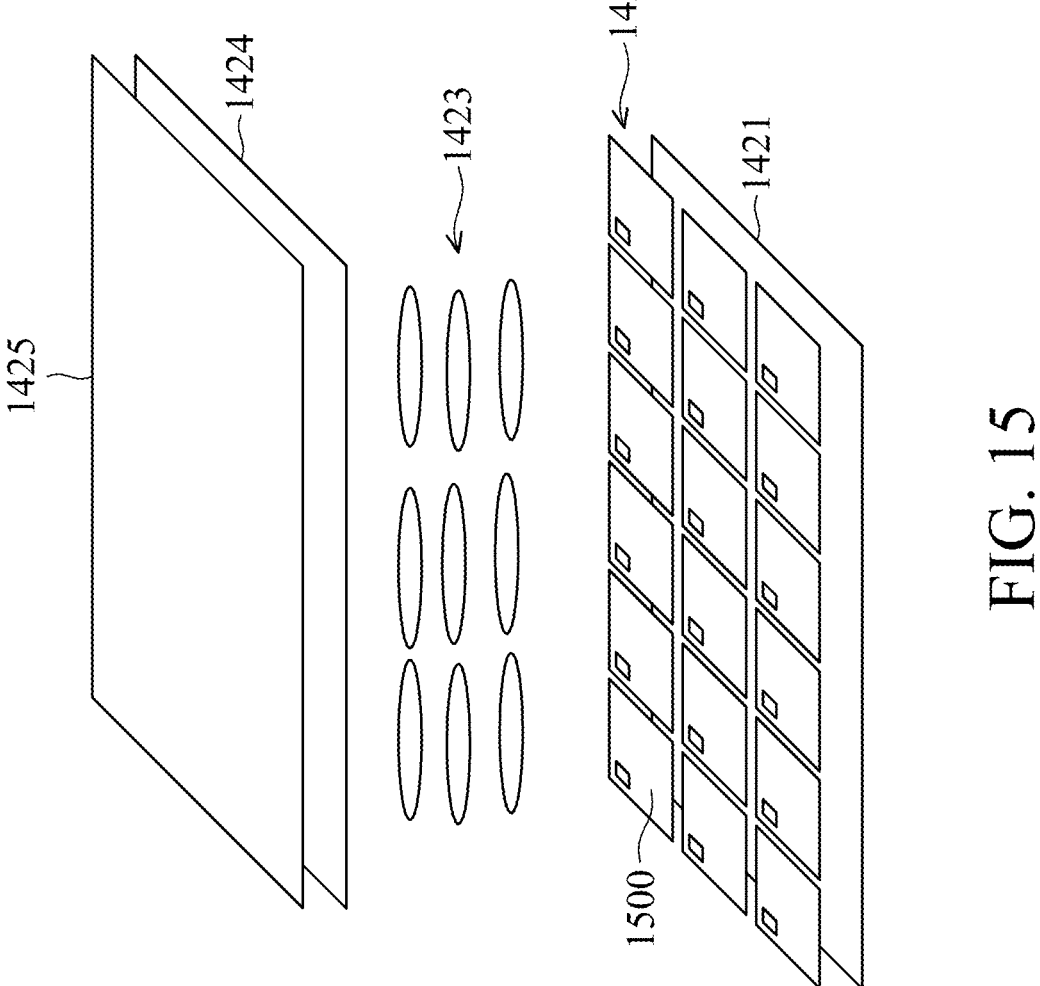
FIG. 15 illustrates an exploded view of a privacy cell, in accordance with some embodiments of the present disclosure.

FIG. 15 illustrates an exploded view of the privacy cell 1420, in accordance with some embodiments of the present disclosure. Referring to FIG. 15, the privacy cell 1420 includes the substrate 1421, the active privacy electrode layer 1422, the liquid-crystal layer 1423, the common electrode layer 1424, and the substrate 1425. In some embodiments, the substrate 1421 and the substrate 1425 are transparent substrates, and may be polyimide (PI) substrates, glass substrates, and the like, but the present disclosure is not limited thereto. In some embodiments, the active privacy electrode layer 1422 may include an array of pixelated privacy electrodes 1500. In some embodiments, the materials of the privacy electrodes 1500 and the common electrode layer 1424 may include indium tin oxide (ITO), indium zinc oxide (IZO), graphene, and the like, but the present disclosure is not limited thereto. In some embodiments, each of the privacy electrodes 1500 is connected to a corresponding thin film transistor. In some embodiments, the liquid-crystal layer 1423 may be a liquid-crystal mode that can be controlled to maintain the collimation of the collimated light. For example, the liquid-crystal layer 1423 may be electrically controlled birefringence (ECB) liquid crystal, twisted nematic (TN) mode Liquid crystal, hybrid liquid crystal, polymer dispersed liquid-crystal (PDLC), polymer network liquid-crystal (PNLC), and the like, but the present disclosure is not limited thereto.

Figure 16:
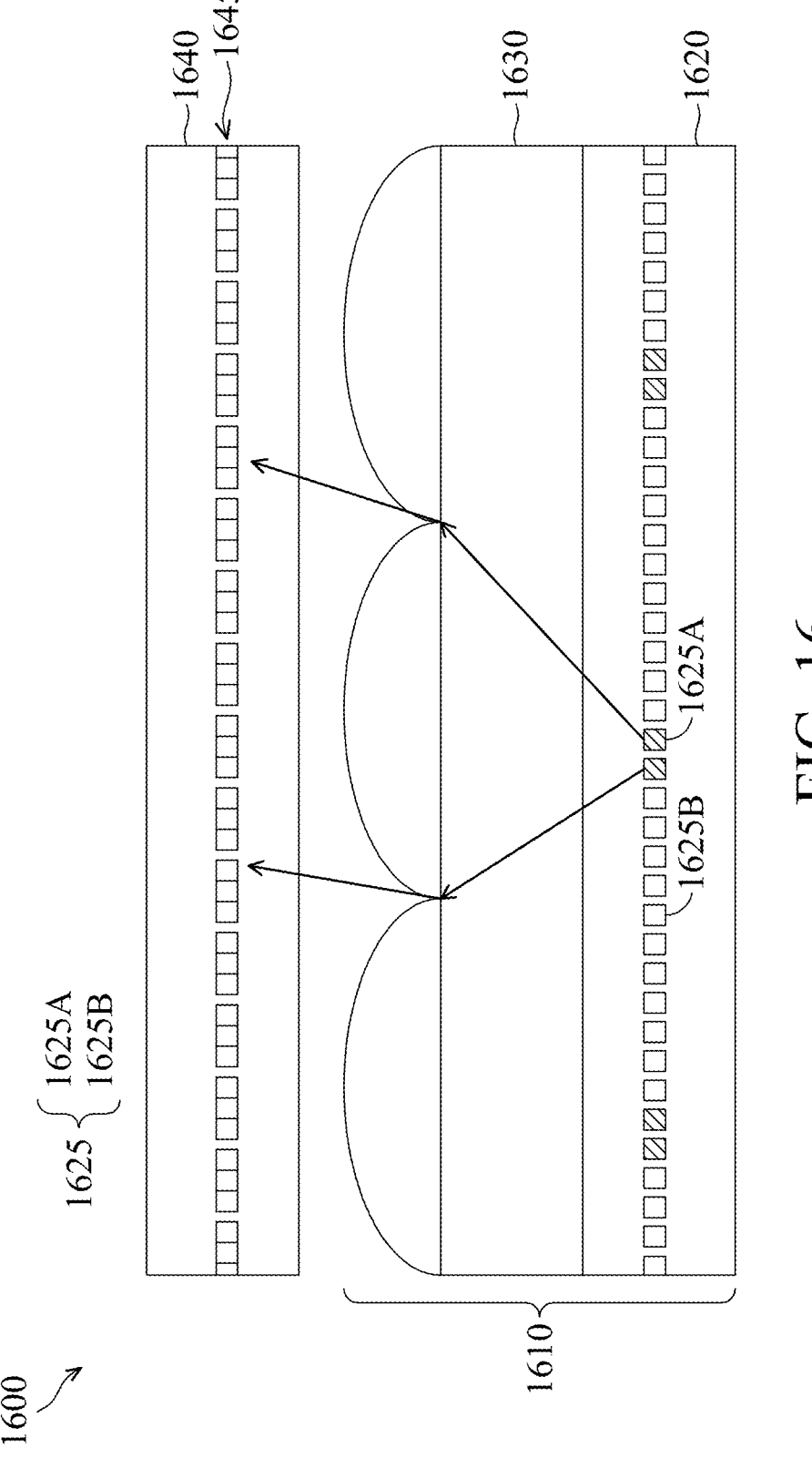
FIG. 16 illustrates a schematic diagram of a privacy display, in accordance with some embodiments of the present disclosure.

FIG. 16 illustrates a schematic diagram of a privacy display 1600, in accordance with some embodiments of the present disclosure. Referring to FIG. 16, the privacy display 1600 includes a privacy emitting light array 1610 and a display panel 1640 over the privacy emitting light array 1610. In some embodiments, the privacy emitting light array 1610 includes a light emitting diode (LED) array 1620 and a lens array 1630 over the LED array 1620. In some embodiments, the LEDs 1625 in the LED array 1620 may be OLEDs, mini LEDs, micro LEDs, or QDLEDs, but the present disclosure is not limited thereto. In some embodiments, the lenses in lens array 1630 may be convex lenses, but the present disclosure is not limited thereto. In some embodiments, lens array 1630 may be a one-dimensional array or a two-dimensional array. In some embodiments, the display panel 1640 includes a color filter layer 1645, but the present disclosure is not limited thereto. In some embodiments, the privacy display 1600 is a self-luminous display. In some embodiments, the privacy display 1600 is a non-self-luminous display, wherein the LED array 1620 is a backlight unit or a portion thereof. In some embodiments, the privacy emitting light array 1610 may be a part of the light control unit of the electronic device.

In some embodiments, the driving circuit of the privacy display 1600 or the LED array 1620 can drive the LED array 1620, so as to control the LEDs 1625 in the LED array 1620 to be turned on (bright) or turned off (dark). In the privacy mode, the emitting light type of the privacy region may be controlled by turning on particular LEDs 1625. For example, the LEDs 1625A located near the focal points (focuses) of the lenses of the lens array 1630 can be turned on, and the other LEDs 1625B can be turned off. This makes the light emitted by the LED array 1620 become collimated light after passing through the lens array 1630. As a result, the emitting light type of the privacy region will be limited in a certain angle range, thereby achieving the privacy effect. Similarly, in some embodiments, by turning on other LEDs 1625 other than the LEDs 1625A, the light emitted by the LED array 1620 is concentrated in a particular angle range after passing through the lens array 1630. In this way, the emitting light type of the privacy region will be limited and can be freely adjusted as the user's eye position changes, thereby achieving the dynamic privacy effect. In other words, the emitting light type of the privacy region can be adjusted according to changes in the user's viewing angle to achieve the dynamic privacy effect. In the non-privacy mode or non-privacy region, the LEDs 1625 in the LED array 1620 may be all turned on or partially turned on in a uniformly distributed manner. In this way, the visible angle of the non-privacy region or non-privacy mode can be increased.

Figure 17:
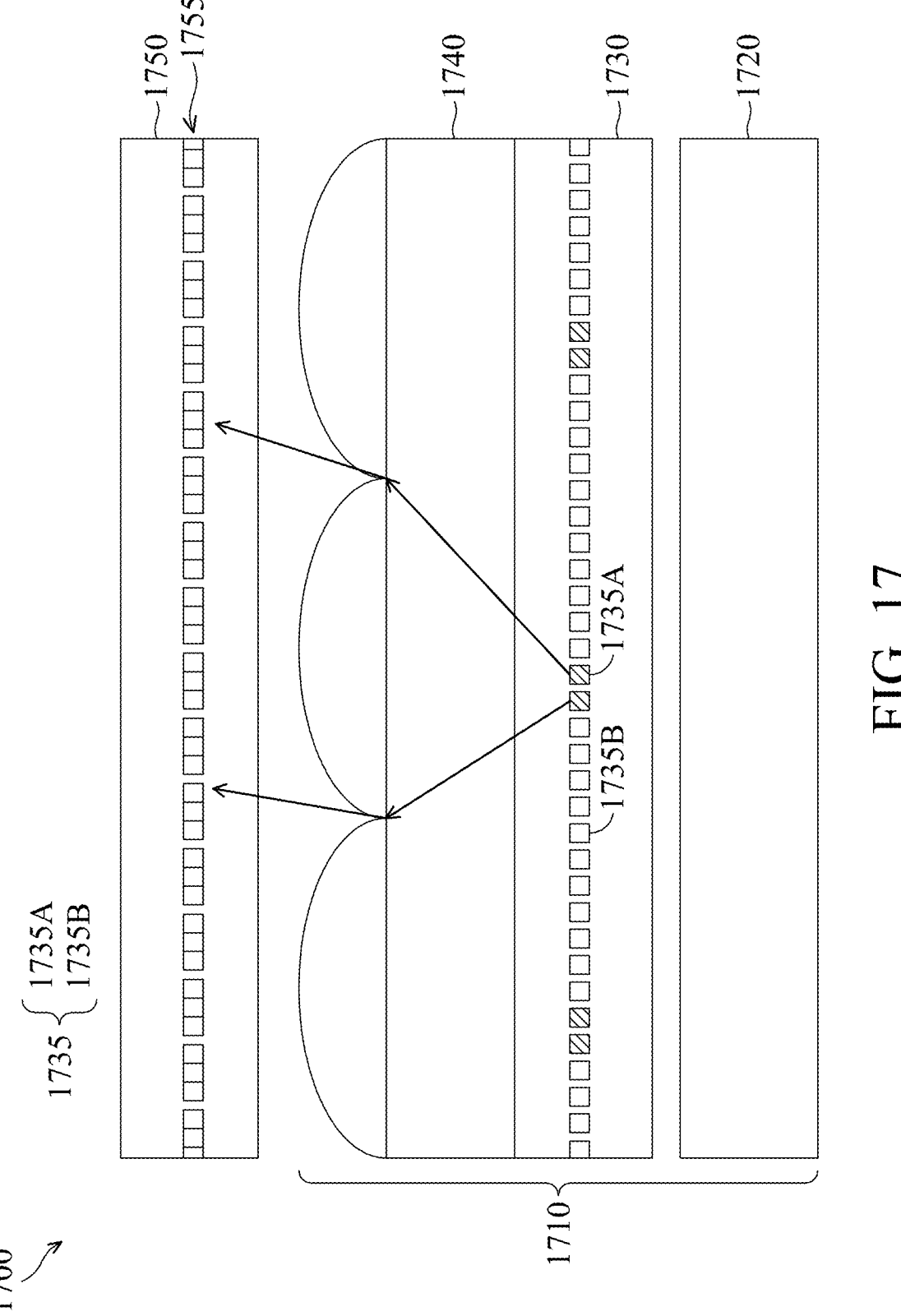
FIG. 17 illustrates a schematic diagram of a privacy display, in accordance with some embodiments of the present disclosure.

FIG. 17 illustrates a schematic diagram of a privacy display 1700, in accordance with some embodiments of the present disclosure. Referring to FIG. 17, the privacy display 1700 includes a privacy emitting light array 1710 and a display panel 1750 over the privacy emitting light array 1710. In some embodiments, the privacy emitting light array 1710 includes a backlight unit 1720, a mono cell array 1730 over the backlight unit 1720, and a lens array 1740 over the mono cell array 1730. In some embodiments, the mono cells 1735 in the mono cell array 1730 may include liquid-crystal material, but the present disclosure is not limited thereto. In some embodiments, the lenses in the lens array 1740 may be convex lenses, but the present disclosure is not limited thereto. In some embodiments, the lens array 1740 may be a one-dimensional array or a two-dimensional array. In some embodiments, the display panel 1750 includes a color filter layer 1755, but the present disclosure is not limited thereto. In some embodiments, the privacy emitting light array 1710 may be a part of the light control unit of the electronic device.

In some embodiments, the driving circuit of the privacy display 1700 can drive the arrangement of liquid-crystal molecules in the mono cells 1735 of the mono cell array 1730, so as to control whether the mono cells 1735 allow the light from the backlight unit 1720 to pass. In the privacy mode, the emitting light type of the privacy region can be controlled by making particular mono cells 1735 allow the light from the backlight unit 1720 to pass. For example, it can make the mono cells 1735A located near the focal points of the lenses of the lens array 1740 allow the light to pass, and make the other mono cells 1735B not allow the light to pass. This makes the light emitted by the backlight unit 1720 become collimated light after passing through the mono cell array 1730 and the lens array 1740. As a result, the emitting light type of the privacy region will be limited in a certain angle range, thereby achieving the privacy effect. Similarly, in some embodiments, it can make other mono cells 1735 other than the mono cells 1735A allow the light to pass, so that the light emitted by the backlight unit 1720 is concentrated in a particular angle range after passing through the mono cell array 1730 and the lens array 1740. As a result, the emitting light type of the privacy region will be limited and can be freely adjusted as the user's eye position changes, thereby achieving the dynamic privacy effect. In other words, the emitting light type of the privacy region can be adjusted according to changes in the user's viewing angle to achieve the dynamic privacy effect. In the non-privacy mode or non-privacy region, the mono cells 1735 in the mono cell array 1730 may be all turned on or partially turned on in a uniformly distributed manner. In this way, the visible angle of the non-privacy region or non-privacy mode can be increased.

Figures 18A, 18B, 18C:
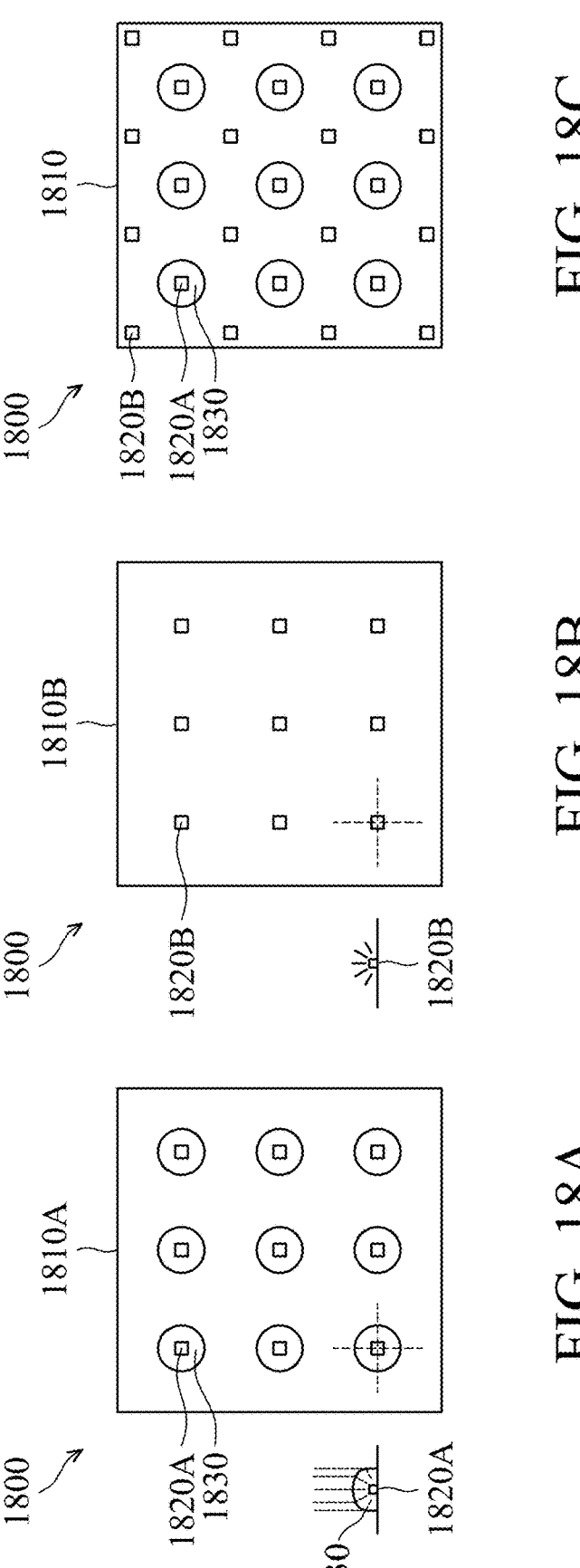
FIGS. 18A to 18C illustrate schematic diagrams of a privacy emitting light module of a privacy display, in accordance with some embodiments of the present disclosure.

FIGS. 18A to 18C illustrate schematic diagrams of a privacy emitting light module 1800 of a privacy display, in accordance with some embodiments of the present disclosure. Referring to FIG. 18A, the privacy emitting light module 1800 includes a first light-emitting array 1810A constituted by a plurality of light sources 1820A. In some embodiments, a corresponding lens 1830 is arranged on each of the light sources 1820A. As shown in the lower left cross-sectional view in FIG. 18A, the arrangement of the lenses 1830 can collimate the light emitted from the light sources 1820A. As a result, the first light-emitting array 1810A will be able to emit collimated light.

Referring to FIG. 18B, the privacy emitting light module 1800 includes a second light-emitting array 1810B constituted by a plurality of light sources 1820B. In some embodiments, different from the light sources 1820A, there are no lens structure arranged on the light sources 1820B. As shown in the lower left cross-sectional view of FIG. 18B, no lens is arranged so that the light emitted from the light sources 1820B remains divergent. As a result, the second light-emitting array 1810B will be able to emit divergent light. In some embodiments, the light sources 1820A and the light sources 1820B may be OLED, mini LED, micro LED, or QDLED, but the present disclosure is not limited thereto.

Referring to FIG. 18C, the light-emitting array 1810 of the privacy emitting light module 1800 includes the first light-emitting array 1810A and the second light-emitting array 1810B. In some embodiments, the privacy emitting light module 1800 may be a part of the light control unit of the electronic device. In some embodiments, the privacy emitting light module 1800 can be applied to a self-luminous display or the backlight unit of a non-self-luminous display, but the present disclosure is not limited thereto.

In some embodiments, the driving circuit of the privacy emitting light module 1800 can drive the light-emitting array 1810 to select whether to turn on the first light-emitting array 1810A and the second light-emitting array 1810B. In the privacy mode, it can choose to turn on the first light-emitting array 1810A to control the emitting light type of the privacy region. For example, the first light-emitting array 1810A can be turned on and the second light-emitting array 1810B can be turned off, so that the light-emitting array 1810 only emits collimated light of the first light-emitting array 1810A. As a result, the emitting light type of the privacy region will be limited in a certain angle range, thereby achieving the privacy effect. In the non-privacy mode or non-privacy region, it can choose to turn off the first light-emitting array 1810A and turn on the second light-emitting array 1810B, or turn on both the first light-emitting array 1810A and the second light-emitting array 1810B at the same time. In this way, the divergent light of the second light-emitting array 1810B can be introduced to increase the visible angle of the non-privacy region or the non-privacy mode.

FIGS. 19A to 19C illustrate schematic diagrams of a privacy emitting light module 1900 of a privacy display, in accordance with some embodiments of the present disclosure. Referring to FIG. 19A, the privacy emitting light module 1900 includes a first light-emitting array 1910A constituted by a plurality of light sources 1920A. In some embodiments, a corresponding blocking wall 1930 is arranged around each of the light sources 1920A. As shown in the lower left cross-sectional view in FIG. 19A, the arrangement of the blocking walls 1930 can collimate the light emitted from the light sources 1920A. As a result, the first light-emitting array 1910A will be able to emit collimated light.

Referring to FIG. 19B, the privacy emitting light module 1900 includes a second light-emitting array 1910B constituted by a plurality of light sources 1920B. In some embodiments, different from the light sources 1920A, the light sources 1920B are not surrounded by the blocking walls. As shown in the lower left cross-sectional view of FIG. 19B, no blocking wall is arranged so that the light emitted from the light sources 1920B remains divergent. As a result, the second light-emitting array 1910B will be able to emit divergent light. In some embodiments, the light sources 1920A and the light sources 1920B may be OLED, mini LED, micro LED, or QDLED, but the present disclosure is not limited thereto.

Referring to FIG. 19C, the light-emitting array 1910 of the privacy emitting light module 1900 includes the first light-emitting array 1910A and the second light-emitting array 1910B. In some embodiments, the privacy emitting light module 1900 may be a part of the light control unit of the electronic device. In some embodiments, the privacy emitting light module 1900 can be applied to a self-luminous display or the backlight unit of a non-self-luminous display, but the present disclosure is not limited thereto.

In some embodiments, the driving circuit of the privacy emitting light module 1900 can drive the light-emitting array 1910 to select whether to turn on the first light-emitting array 1910A and the second light-emitting array 1910B. In the privacy mode, it can choose to turn on the first light-emitting array 1910A to control the emitting light type of the privacy region. For example, the first light-emitting array 1910A can be turned on and the second light-emitting array 1910B can be turned off, so that the light-emitting array 1910 only emits collimated light of the first light-emitting array 1910A. As a result, the emitting light type of the privacy region will be limited in a certain angle range, thereby achieving the privacy effect. In the non-privacy mode or non-privacy region, it can choose to turn off the first light-emitting array 1910A and turn on the second light-emitting array 1910B, or turn on both the first light-emitting array 1910A and the second light-emitting array 1910B at the same time. In this way, the divergent light of the second light-emitting array 1910B can be introduced to increase the visible angle of the non-privacy region or the non-privacy mode.

Figures 20A, 20B, 20C:
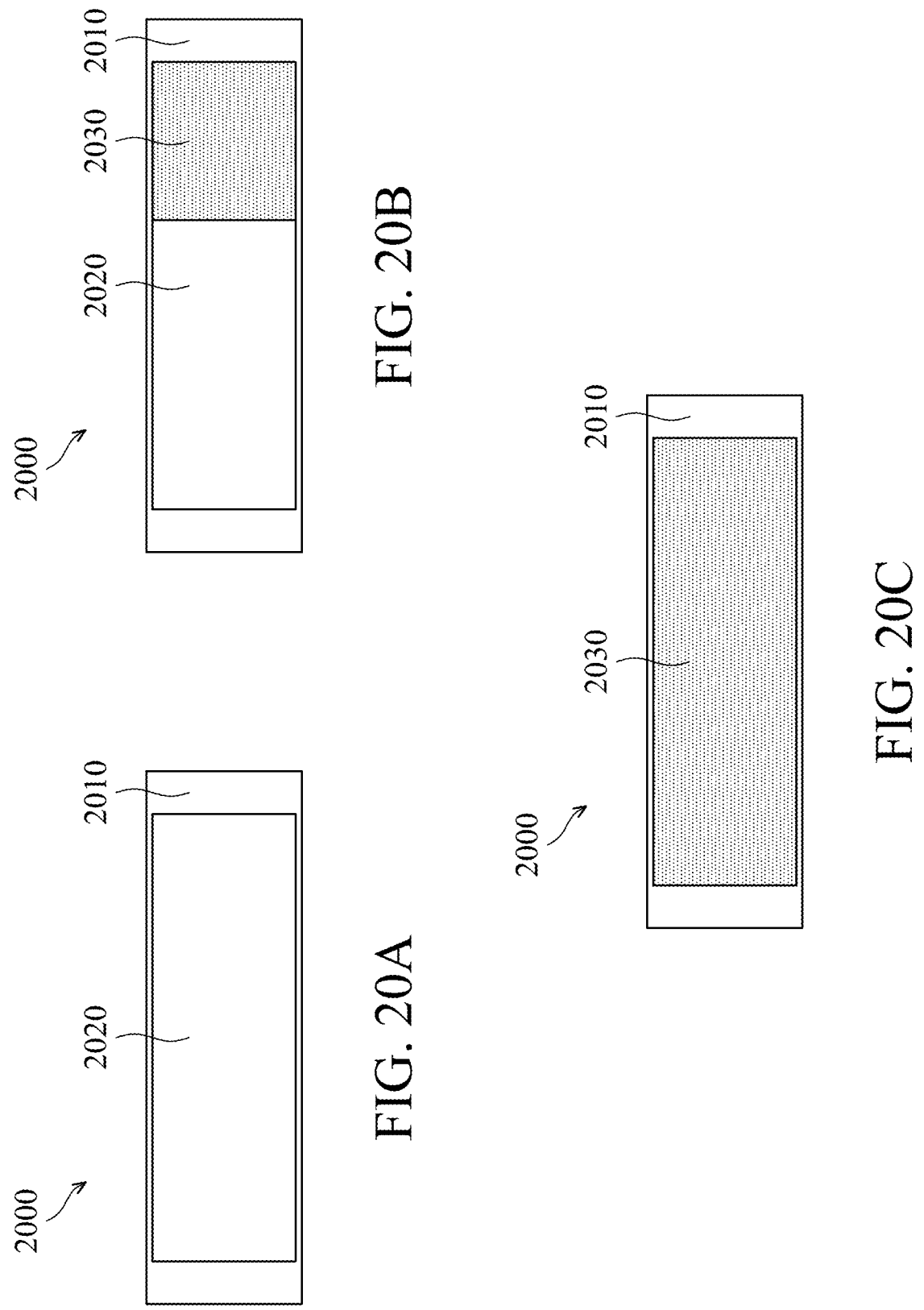
FIGS. 20A to 20C illustrate schematic diagrams of a privacy display, in accordance with some embodiments of the present disclosure.

FIGS. 20A to 20C illustrate schematic diagrams of a privacy display 2000, in accordance with some embodiments of the present disclosure. Referring to FIG. 20A, the privacy display 2000 includes a frame 2010 and a display area 2020. Referring to FIG. 20B, the privacy display 2000 further includes a privacy filter 2030. In some embodiments, the privacy filter 2030 can be stored in the frame 2010, for example, stored in a scroll manner, but the present disclosure is not limited thereto. In some embodiments, the privacy filter 2030 can be freely moved to cover the display area 2020. For example, as shown in FIG. 20B, the privacy filter 2030 may partially cover the display area 2020 to form a privacy region. In this way, users can define privacy regions according to their own requirements. In some embodiments, the privacy filter 2030 can completely cover the display area 2020 so that the entire display area 2020 becomes the privacy region, as shown in FIG. 20C.

In some embodiments, the privacy display 2000 may be a self-luminous display or a non-self-luminous display. In some embodiments, the movement of the privacy filter 2030 may be manually performed by the user. In some embodiments, the movement of the privacy filter 2030 may be performed by a mechanical structure. For example, after the user selects the size of the required privacy region, the privacy filter 2030 can be moved by an actuator installed in the frame 2010 to cover the required privacy region. In some embodiments, the privacy filter 2030 may be a part of the light control unit of the electronic device.

Figure 21:
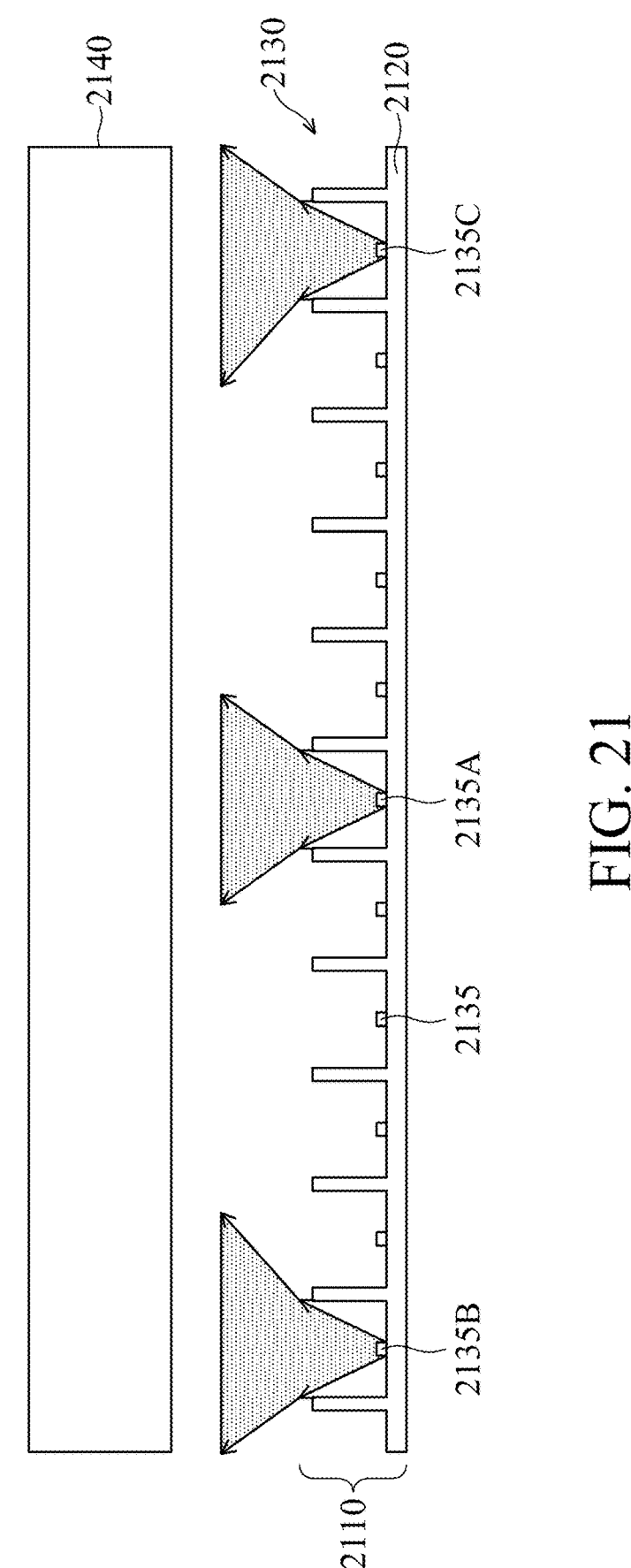
FIG. 21 illustrates a schematic diagram of a privacy display, in accordance with some embodiments of the present disclosure.

FIG. 21 illustrates a schematic diagram of a privacy display 2100, in accordance with some embodiments of the present disclosure. Referring to FIG. 21, the privacy display 2100 includes a privacy emitting light module 2110. The privacy emitting light module 2110 includes a blocking wall structure 2120 and a light-emitting array 2130 constituted by a plurality of light sources 2135. In some embodiments, each of the light sources 2135 of the light emitting array 2130 is individually separated by the blocking wall structure 2120, but the present disclosure is not limited thereto. In some embodiments, the light sources 2135 may be OLEDs, mini LEDs, micro LEDs, or QDLEDs, but the present disclosure is not limited thereto. In some embodiments, the a privacy emitting light module 2110 may be a part of the light control unit of the electronic device.

In some embodiments, the emitting light angle of each light source 2135 can be defined by the positions of the light sources 2135 in the blocking wall structure 2120. For example, the light source 2135A can be located in the center of the blocking walls on opposite sides, so that the light emitted by the light source 2135A is concentrated directly upward, as shown in FIG. 21. For example, the light source 2135B can be closer to the left blocking wall and farther away from the right blocking wall, so that the light emitted by the light source 2135B is concentrated toward the upper right, as shown in FIG. 21. For example, the light source 2135C can be closer to the right blocking wall and farther away from the left blocking wall, so that the light emitted by the light source 2135C is concentrated toward the upper left, as shown in FIG. 21. In this way, the privacy display 2100 can select the light sources 2135 with suitable emitting light angle as the light source according to the requirements of the privacy region. In other embodiments, the emitting light angles of the light sources 2135 can be defined by the blocking wall structure 2120 with blocking walls having different heights, but the present disclosure is not limited thereto.

In some embodiments, the privacy display 2100 further includes a privacy cell 2140 disposed over the privacy emitting light module 2110. In some embodiments, privacy cell 2140 is similar to the privacy cell 1420 described above. In some embodiments, the privacy cell 2140 can be used to switch the light emitted by the privacy emitting light module 2110 between collimated light and non-collimated light. For example, the privacy cell 2140 can remain the collimation of the light emitted by the privacy emitting light module 2110 in the privacy region. In some embodiments, the privacy emitting light module 2110 and the privacy cell 2140 may be a part of the light control unit of the electronic device.

In summary, the embodiments of various privacy display methods and privacy display devices of the present disclosure provide many advantages. The various embodiments of the present disclosure can be mixed and matched as long as they do not violate the spirit of the disclosure or conflict with each other. Through the embodiments of the present disclosure, users can define the privacy region they require when using the privacy function. In addition, users can also predefine the privacy window they require to quickly obtain the protection of the privacy function when activating the privacy function. Furthermore, under the dynamic privacy function provided by the present disclosure, the user can change the posture and position arbitrarily while still being able to clearly watch the displayed content and be protected by the privacy function. Moreover, for application in automotive displays, any display area that may affect the driver can be freely masked based on the driver's judgment to improve driving safety. Not only that, for an ATM or kiosk, the privacy region can be controlled within an area such as the account number and password input area, and other areas can be adjusted to non-privacy region for functions such as advertising.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A display device for controlling a privacy region, wherein the display device comprises:
   a display unit, configured to display images;
   a processing unit, electrically connected to the display unit, and configured to define the privacy region according to a predefined privacy requirement; and
   a light control unit, electrically connected to the processing unit, and configured to control an emitting light angle of the privacy region, wherein the light control unit comprises a privacy emitting light array, and the privacy emitting light array comprises a backlight unit, a mono cell array over the backlight unit, and a lens array over the mono cell array,
   wherein the mono cell array comprises first mono cells located at focal points of lenses of the lens array, and second mono cells other than the first mono cells.

2. The display device as claimed in claim 1, wherein the light control unit further comprises a privacy cell, a privacy emitting light module, or a privacy filter.

3. The display device as claimed in claim 1, further comprising:
   an optical sensor, configured to track an eye position of a user,
   wherein the light control unit controls the emitting light angle of the privacy region according to a viewing angle of the eye position relative to the display unit.

4. The display device as claimed in claim 1,
   wherein the light control unit comprises a privacy emitting light module, and the privacy emitting light module comprises a first light-emitting array constituted by a plurality of first light sources and a second light-emitting array constituted by a plurality of second light sources.

5. The display device as claimed in claim 4, wherein in a privacy mode, the light control unit turns on the first light-emitting array and turns off the second light-emitting array in the privacy region.

6. The display device as claimed in claim 4, wherein in a non-privacy mode, the light control unit turns off the first light-emitting array and turns on the second light-emitting array.

7. A display device for controlling a privacy region, the display device comprises:
   a display unit, configured to display images;
   a touch unit, electrically connected to the display unit, wherein the privacy region is determined by the touch unit; and
   a light control unit, electrically connected to the touch unit, and configured to control an emitting light angle of the privacy region, wherein the light control unit comprises a privacy emitting light array, and the privacy emitting light array comprises a backlight unit, a mono cell array over the backlight unit, and a lens array over the mono cell array,
   wherein the mono cell array comprises first mono cells located at focal points of lenses of the lens array, and second mono cells other than the first mono cells.

8. The display device as claimed in claim 7, further comprising:
   an optical sensor, configured to track an eye position of a user,
   wherein the light control unit controls the emitting light angle of the privacy region according to a viewing angle of the eye position relative to the display unit.

9. The display device as claimed in claim 7, wherein the light control unit further comprises a privacy cell, a privacy emitting light module, or a privacy filter.

10. The display device as claimed in claim 7, wherein in a privacy mode, the light control unit controls the first mono cells to allow a light from the backlight unit to pass through the first mono cells, and controls the second mono cells to not allow the light from the backlight unit to pass through the second mono cells.

11. The display device as claimed in claim 7,
   wherein the light control unit comprises a privacy emitting light module, and the privacy emitting light module comprises a first light-emitting array constituted by a plurality of first light sources and a second light-emitting array constituted by a plurality of second light sources,
   wherein for each of the first light sources, a corresponding blocking wall is arranged around each of the first light sources.

12. The display device as claimed in claim 11, wherein in a privacy mode, the light control unit turns on the first light-emitting array and turns off the second light-emitting array in the privacy region.

13. The display device as claimed in claim 11, wherein in a non-privacy mode, the light control unit turns on both the first light-emitting array and the second light-emitting array.

*     *     *     *     *